United States Patent
Shukla et al.

(10) Patent No.: US 11,916,910 B1
(45) Date of Patent: Feb. 27, 2024

(54) REMEDYING WIRELESS-NETWORK CONNECTION FAILURES

(71) Applicant: Amazon Technologies, Inc., Seattle, WA (US)

(72) Inventors: Ashish Kumar Shukla, Milpitas, CA (US); Avinash Joshi, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/357,873

(22) Filed: Jun. 24, 2021

(51) Int. Cl.
| | |
|---|---|
| H04L 9/40 | (2022.01) |
| H04W 12/086 | (2021.01) |
| H04W 24/08 | (2009.01) |
| H04W 12/06 | (2021.01) |

(52) U.S. Cl.
CPC ............ *H04L 63/10* (2013.01); *H04L 63/083* (2013.01); *H04W 12/06* (2013.01); *H04W 12/086* (2021.01); *H04W 24/08* (2013.01)

(58) Field of Classification Search
None
See application file for complete search history.

(56) References Cited

U.S. PATENT DOCUMENTS

| | | | | |
|---|---|---|---|---|
| 10,594,990 B1 * | 3/2020 | Lemberger | ............... | H04W 4/80 |
| 11,245,690 B1 * | 2/2022 | Yoon | ....................... | G06F 21/64 |
| 2012/0163292 A1 * | 6/2012 | Kneckt | ............ | H04W 52/0229 |
| | | | | 370/328 |
| 2013/0182795 A1 * | 7/2013 | Cherian | .................. | H04L 25/02 |
| | | | | 375/316 |
| 2015/0327062 A1 * | 11/2015 | Tatavarty | ................ | G06F 21/34 |
| | | | | 726/6 |
| 2017/0041977 A1 * | 2/2017 | Yokoyama | ............ | H04W 76/19 |
| 2020/0015286 A1 * | 1/2020 | Smith | .................... | H04W 48/20 |
| 2021/0307103 A1 * | 9/2021 | Koizumi | ............... | G06F 3/1236 |
| 2022/0167237 A1 * | 5/2022 | Itagaki | ................ | H04W 12/069 |

FOREIGN PATENT DOCUMENTS

| | | | | |
|---|---|---|---|---|
| CN | 104812092 A | * | 7/2015 | ............ H04W 48/08 |
| CN | 108924905 A | * | 11/2018 | ............ H04L 67/06 |
| CN | 110868718 A | * | 3/2020 | |
| CN | 112199214 A | * | 1/2021 | |

* cited by examiner

*Primary Examiner* — Gennadiy Tsvey
(74) *Attorney, Agent, or Firm* — Lee & Hayes P.C.

(57) ABSTRACT

The disclosure describes, in part, techniques for attempting to diagnose the cause of a wireless connection problem in a client computing device and, in response, performing one or more actions for remedying the problem. In some instances, the techniques describe the client device communicating with one or more other client devices in the environment to determine whether they are connected to the WAP using the same password or a different password as the client device. If the former, then the client device may determine that the network stack is likely the cause of the connection error and may attempt to restart the network stack to current problem. If the other devices indicate that they are using the same password, however, then the client device may prompt a user to re-enter the network password.

20 Claims, 19 Drawing Sheets

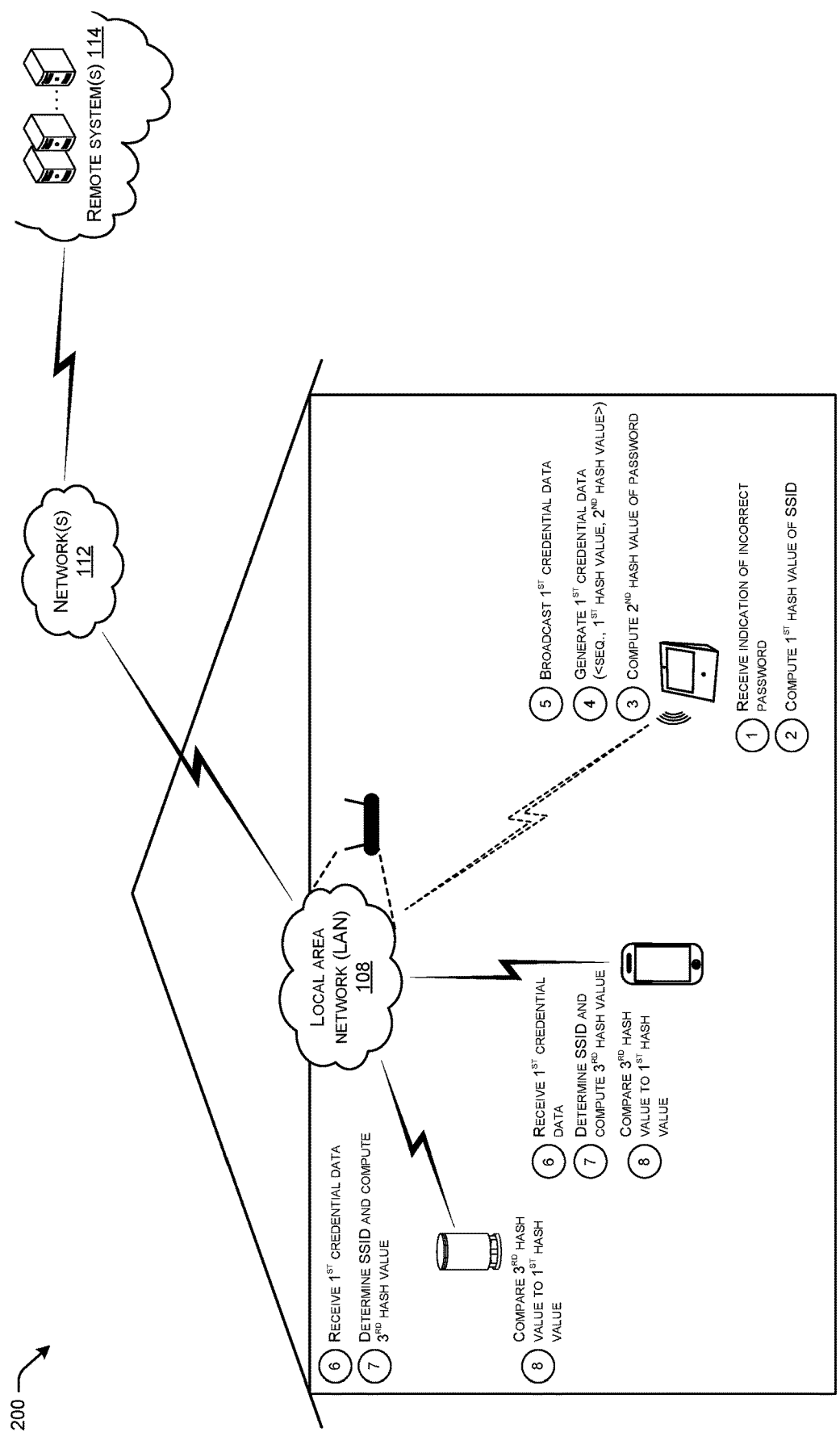

REMEDYING WIRELESS-NETWORK CONNECTION FAILURES

BACKGROUND

As computing devices continue to evolve, the amount of computing devices used in everyday life continues to proliferate. For instance, it is not unusual for a home environment to include an array of client computing devices, such as mobile phones, tablet computing devices, voice-controlled devices, smart televisions, HDMI plug-in sticks, audiovisual devices, and the like. In many instances, each of these client computing devices are configured to access content and/or communicate with other devices over the Internet by connecting to a wireless access point (WAP) within the home environment. Given the ever-increasing amount of devices within the home and other environments, as well as users' ever-increasing reliance on these devices, ensuring connection between each client device and a local WAP remains important.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A-B collectively illustrate a sequence of operations in which a first client device within the environment of FIG. 1 is unable to access the WAP using a password (input by a user or otherwise) and, in response, broadcasts a message to other client devices in the environment to determine whether they are using the same or different password. In this example, a second client device indicates that it is using a different password to access the same WAP and, in response to receiving this indication, the first client device outputs a request for a user to input a new password for connecting to the WAP.

FIGS. 5A-C collectively illustrate a flow diagram of another example process in which a first client device is unable to access the WAP using a password and, in response, sends a message to a second client device to determine whether the second client device is using a different password. In response to determining that the second client device is not using a different password, the first client device may perform one or more actions, such as restarting a network component, logging the error, or the like.

DETAILED DESCRIPTION

Figure 1:
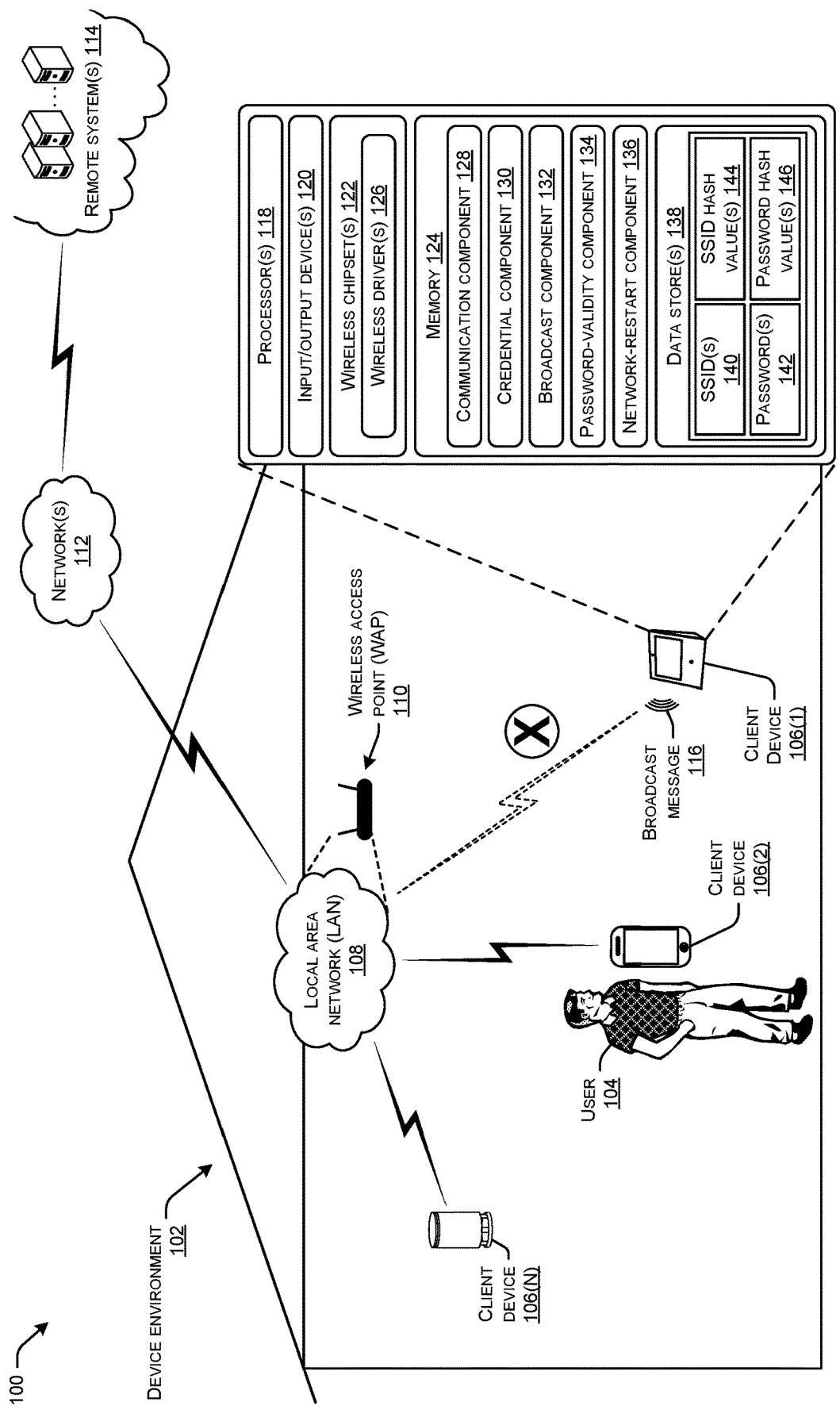
FIG. 1 illustrates a schematic diagram of an illustrative architecture including a device environment that includes multiple client devices configured to communicate with remote systems after connecting to a local area network (LAN) provided by a wireless access point (WAP) within the system. In some instances, errors may occur within a network component of a client device, which may result in the client device failing to the successfully connect to the WAP and, in some instances, cause software operating on the client device to incorrectly indicate that a user of the client device has input an incorrect network password for accessing the WAP. Thus, the client devices within FIG. 1 are configured to implement techniques for deducing when these errors are occurring within the network components of the devices and, in response, attempt to remedy the errors in order to enable connections with the WAP.

The disclosure describes, in part, techniques for attempting to diagnose the cause of wireless connection problems in client computing devices and, in response, performing one or more actions for remedying the problems. For example, a client computing device often accesses the Internet and/or other networks by first connection to a wireless access point (WAP) in an environment of the client device. Many WAPs, however, require a network password in order for the example client device to successfully establish a connection with the WAP. For instance, a user of the client device may manually enter the network password of WAP into the client device, the client device may receive the network password from another client device in the environment or from a secure user account associated with the client device, or the like.

Regardless of how the client device receives the password (from a user, another client device, or otherwise), the client device may engage in a process for establishing a connection with the WAP, which may include the client device providing data indicative of the password to the WAP. If the WAP determines that the password is correct, then the WAP and the client device may establish a connection with one another. If the password is incorrect, however, the WAP may inform the client device that the password is incorrect and may deny a connection with the client device. In response to receiving this indication, the client device may output, to a user of the client device, an indication that the network password is incorrect and, potentially, an interface to enable the user to re-enter the password.

In some instances, however, a wireless network stack operating on the client device may be the cause of the failure to establish the connection with the WAP. For instance, during the connection process, the WAP and the client device may engage in a key-exchange process that involves the client device sending one or more data frames to the WAP and receiving one or more data frames from the WAP. Generally, for instance, this key-exchange process may involve sending, to the WAP, data indicative of the network password stored at the client device. In instances where the network stack is not behaving properly, however, the network stack may fail to transmit one or more of these data frames to the WAP. When the WAP fails to receive these data frames (and, hence, the network password), the WAP will refrain from establishing a connection with the client device, and eventually the key-exchange process will timeout. Further, the WAP may indicate to the client device that the incorrect password was provided (given that no password was provided), which may result in the client device erroneously outputting to the user an indication that the incorrect password was inputted to the client device. That is, despite the client device potentially storing the correct network password for the WAP, the client device may output an indication that the password is incorrect, given that the network stack failed to transmit the password to the WAP. Understandably, users may be frustrated, given that they may believe that they have input the correct network password to their respective client device.

Described herein, therefore, are techniques to deduce when an error is occurring at the network-stack level and perform one or more actions in response, such as attempting to remedy the error (to enable a successful connection), logging the error (to understand the scope of the problem and potentially lead to effort fixing the problems in the network stack), refraining from outputting an indication of an incorrect password (to avoid informing the user of potentially incorrect information), and/or the like. For instance, in response to a client device receiving an indication that a network password associated with a WAP is incorrect, the techniques may determine whether the password is likely incorrect or whether an error likely occurred at the network-stack level. In the former instances, the techniques may attempt to receive a new password—either via entry by a user, from a peer client device, or the like. In the latter instances, the techniques may restart the network stack in order to potentially cure any problems occurring therein.

In some instances, a first set of techniques make this determination by communicating with one or more other client devices in the environment. For instance, the example client device may communicate with one or more other devices potentially connected to the WAP to determine whether they are connected to the WAP using the same password or a different password. If the former, then the client device may determine that the network stack is likely the cause of the connection error. In other instances, meanwhile, a second set of techniques may make the determination by configuring a wireless driver operating as part of the network stack to output, to a communication component operating in memory of the client device, an indication when the network stack fails to transmit a frame as part of the afore-mentioned key-exchange process. In response to the communication component determining that a timeout has occurred during the connection process with the WAP, this component may determine whether an indication of a frame-transmission failure has been received from the wireless driver. If so, then the client device may determine that the network stack is likely the cause of the connection error.

As introduced above, a first set of techniques may determine whether a network stack is likely to blame for a connection failure, rather than an incorrect password, based on communication with other client devices in the environment. For instance, in response to a client device receiving an indication of a failure to connect with a WAP in the environment (e.g., due to an incorrect password), the client device may be configured to generate first credential data that includes information based on an identifier (e.g., SSID) of the WAP and based on a current password stored by the client device in association with the WAP. For instance, the client device may generate a first hash value (e.g., using SHA-256 or any suitable hash function) of the SSID or a portion of the SSID, in addition to a second hash value of the password or a portion of the password. In addition, the client device may append a sequence number to the credential data, with the sequence number increasing each time a client device broadcasts credential data to other client devices in the environment. Thus, the credential data may include a sequence number, some or all of the first hash value, and some or all of the second hash value as follows:

(Sequence Number, last four digits of first hash value, last four digits of second hash value)

Thus, when a client device in the environment is the first to broadcast this type of credential data, it may include a sequence number of one (1). If another client device responds to the credential data, it may include the sequence number (one) so that the client device that broadcast the initial credential data can determine that the response is responsive to the initial credential data. Further, when another client device in the environment broadcasts new credential data (in response to failing to establish a connection with the WAP or another), this new credential data may include an incremented sequence number (e.g., two (2)), and so forth.

In some instances, the client device broadcasting the initial credential data may broadcast this data over a short-range wireless network (e.g., Bluetooth, Zigbee, etc.), WiFi, or any other network. One or more additional devices in the environment may receive this credential data and may determine whether to respond to it. For instance, a client device that receives this data may first compute a hash value of some or all of the WAP that it is currently connected to and/or other WAPs known to the receiving client device and compare some or all of these hash values to the first hash value indicated in the credential data. For instance, the receiving client device may compute a hash value of the SSID of the WAP that it is connected to and compare the last four digits of this hash value to the first hash value in the credential data (comprising the last four digits of the hash value as computed by the sending client device). The receiving client may do the same for other WAPs known to the receiving client device. If receiving client device is unable to determine a match, the receiving client device may take no action, given that it does not store information regarding the WAP indicated by the credential data.

If, however, the receiving client device identifies a match, indicating that the receiving client device is connected to or otherwise stores information about the WAP referenced in the credential data, then the receiving client device may determine the password that it currently stores in association with the identified WAP. Thereafter, the client device may compute a hash value of some or all of this password and compare this hash value to some or all of the second hash value indicated in the credential data. If these values match, then the receiving client device may determine that it is using the same password as the client device that sent the credential data. If the values do not match, then the receiving client device may determine that it is using a different password. In some instances, the receiving client device may generate data for sending to the client device that sent the initial credential data, with this data indicating that the receiving client device is using a different (or is using the same password).

In one example, the receiving client device may refrain from sending data back to the initial client device if the receiving client device determines that it is using the same password, but may send data to the client device in instances when the receiving client device determines that it is using a different password for the same WAP. Of course, in some instances, the devices may be configured to in the opposite manner (i.e., configured to send data when passwords match, but not when they do not) or the devices may be configured to send data in either instance. That is, the devices may be configured to generate hash values of the SSID and password they are using, respectively, and may send this credential data to the device that broadcasted the initial credential data. In these instances, the client device that initially broadcast the credential data may compare this credential data to the received credential data to determine whether password-hash values match and, thus, whether the client device is using the correct password or not. In some instances, configuring the client devices to respond to received credential data regardless of whether the passwords match enables the client device that sent the initial credential data to determine relatively quickly whether or not it is using the correct password, rather than needing to wait until a threshold amount of time expires before determining that no response has been received and, thus, that the device is likely using the correct password (or the incorrect password in instances where the devices are configured to send back credential data in response to determining that their passwords match).

In this example, the receiving client device may be configured to generate and send second credential data back to the device that sent the initial credential data, with these second credential data comprising the same sequence number, some or all of the hash value of the WAP (which will be the same as the initial credential data), and some or all of the hash value of the password used by the receiving client device, such as the last four digits of this hash value. In some instances, the receiving client device may send this second credential data directly to the client device or may broadcast this in the same or similar manner as the client device broadcasted the initial credential data. Upon receiving the second credential data, the client device that send the initial credential data may first determine that the sequence number matches the sequence number that the client device sent in the initial credential data (e.g., one (1)) and, thus, that this second credential data is responsive to the initial credential data. Further, the client device may determine that the first listed hash value matches the first hash value in the initial credential data. Further, the client device may determine that the second listed hash value does not match the second hash value in the initial credential data, thus indicating that the receiving client device is using a different password for the same WAP. Based on this information, the client device may determine that the password it is currently using may in fact be incorrect (rather than being caused by an error in the network stack) and, thus, the client device may output an indication to a user that the password used for the WAP is incorrect. The client device may also attempt to remedy the issue by outputting a prompt to the user to re-enter the password, retrieving the password for the WAP from an account associated with the user or environment, retrieving the password for another client device in the environment, and/or the like.

While this example describes the receiving client device sending second credential data indicating that it using a different password than one used by client device that sent the initial credential data, in some instances the receiving client device may instead securely send the password it is using to the other client device. Further, while this example describes the receiving client device sending the second credential data in response to receiving the initial credential data in the manner described above, in some instances the receiving client device may refrain from doing so if it determines that another client device in the environment has already responded to the initial credential data. For instance, if the receiving client device receives, before sending the second credential data, additional credential data indicating the same sequence number as the initial credential data (e.g., one (1)), then the receiving client device may refrain from sending (or generating) the second credential data.

As will be appreciated, the techniques above enable a client device that is unable to successfully connect to WAP to deduce whether the error is likely due to an invalid password or a problem in the network stack. For instance, if the client device receives the second credential data as described above, the client device may determine that the error is likely due to an invalid password and, thus, may attempt to remedy this problem. If, however, the client device does not receive a response to the initial credential data, then the client device may be configured to determine that other client devices in the environment are using the same password and, thus, that the error is likely due to a problem in the network stack rather than caused by an invalid password. In these instances, the client device may attempt to remedy the problem by restarting at least one component in the network stack and/or may store an indication of the error in a log of errors.

In some instances, a client device may be configured to initially communicate with other client devices and/or a WAP in the environment to determine whether other client devices are configured to respond to the credential data in the manner described above. For example, an example client device may be configured to broadcast an initial message requesting to receive data indicating whether one or more devices in the same environment are able to perform the techniques described above. In response to receiving at least one response indicating that at least one client device is able to perform these techniques, the client device may perform the techniques described above in response to failing to successfully join a WAP in the environment. Stated otherwise, each client device in the environment may be configured to determine whether the environment includes at least one additional client device (or WAP) that is configured to perform the techniques before proceeding to generate and broadcast the initial credential data, given that generating and broadcasting such credential data would yield no result if the environment does not include devices able to analyze and respond to this credential data.

Turning to the second set of techniques, a client device may be configured to determine when a network stack is likely to blame for a connection failure, rather than an incorrect password, based on communications received from a wireless driver stored on the client device. As described above, the client device may engage in a key-exchange process with the WAP when attempting to establish a connection with the WAP. In instances where a problem exists in the network stack, however, the client device may fail to transmit one or more data frames as part of this key-exchange process. Thus, the WAP and the client device may fail to establish a connection and the client device may incorrectly output an indication that this failure is due to an incorrect password.

To avoid the output of this errant indication, however, the wireless driver of a wireless chipset of the client device may be configured to send, to a communication component stored in memory of the client device, an indication when the client device fails to transmit a frame as part of this key-exchange process. For instance, if a data frame was not sent from a buffer of the wireless chipset, because the buffer is saturated or the data frame was filtered from the buffer due to age, then the wireless driver may transmit an indication of this event to the communication component. Further, if a layer-two acknowledgment (ack) message is not received from the WAP, then the wireless driver may also output this indication, given that this may be an indication that the data frame was never sent by the client device.

In addition to receiving this indication from the wireless driver, the communication component of the client device may also receive an indication of a timeout occurring during the process of attempting to establish a connection to the WAP. In response to receiving an indication that a timeout has occurred—and thus the attempted connection with the WAP has failed—the communication component may determine whether an indication of a data-frame-transmission failure has been received. If not, meaning that the client device sent all required data frames to the WAP, then the communication component may determine that the failed connection is likely due to an invalid password. Thus, the communication component may cause the client device to output an indication of the incorrect password and may attempt to remedy the error by requesting that the user re-enter the password, retrieving the password from another location, or the like.

If, however, such an indication was received from the wireless driver, then the communication component may determine that the connection likely failed due to an error in the network stack. In response to making this determination, the communication component may refrain from outputting an indication that the password was invalid and may instead attempt to restart at least one component of the network stack in order to potentially remedy the problem. The client device may then re-attempt to establish the connection with the WAP. In addition, or in the alternative, to restarting a network component, the communication component may store an indication of the error in a log of errors.

Further, while the above example describes the wireless driver being configured to output an indication of a data-frame-transmission failure, in other instances the communication component may make this determination by calling an application programming interface (API) provided by the wireless driver. For instance, in response to determining that a timeout has occurred during the process of attempting to establish a connection with the WAP, the communication component may call the API to determine whether a data-frame-transmission failure has occurred.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an illustrative architecture 100 in which the techniques may be implemented. In this example, the architecture 100 includes a device environment 102 that includes an example user 104 and multiple example client devices 106(1), 106(2), . . . 106(N) (collectively, "client devices 106"). The client devices 106 may comprise mobile phones, tablet computing devices, audiovisual devices, smart televisions, laptop computers, voice-controlled devices, HDMI plug-in sticks, wearable devices and/or any other type of client computing device. Further, each of the client devices 106 may be configured to establish a connection with a local area network (LAN) 108 via a wireless access point (WAP) 110 in the environment. Upon establishing a connection with the LAN 108 via the WAP 110, each client device may be coupled to one or more networks 112 for accessing an array of remote systems 114.

As illustrated, the client device 106(N) and the client device 106(2) have established a connection with the WAP 110, while the client device 106(1) has failed to establish this connection. In some instances, the connection between the client device 106(1) and the WAP 110 may fail based on the user 104 inputting an incorrect network password for the WAP (or the client device 106(1) otherwise attempting to connect to the WAP 110 with an incorrect password) or based on an error occurring within a wireless network stack of the client device 106(1). As introduced above, the client device 106(1) may be configured to determine whether this connection has likely failed due to an incorrect password or due to an error in the network stack, and may perform different actions based to attempt to remedy this error based on this determination.

FIG. 1, for instance, illustrates that, in some examples, the client device 106(1) may transmit a broadcast message 116 to the other client devices in the environment 102 to attempt to determine whether the client device is using the incorrect password for the WAP 110 or whether the error is likely based on a problem in the network stack. In other instances, the client device 106(1) may be configured to receive information from a wireless driver operating on the client device 106(1) to make this determination.

As illustrated, the client device 106(1) includes one or more processors 118, one or more input/output devices 120, one or more wireless chipset(s) 122 for enabling wireless connections to the WAP 110 and otherwise, and memory 124. The processor(s) 118 may comprise physical hardware processors, each having one or more processing cores. The input/output devices 120 may comprise displays, speakers, microphones, touchscreens, keyboards, and/or any other type of device capable of receiving or outputting input/content. The wireless chipset(s) 122 may comprise chipsets configured to establish connections over WiFi, Bluetooth, Zigbee, and/or any other type of wireless network. As illustrated, each wireless chipset 122 may store a wireless driver 126, which may comprise software and/or firmware for establishing network connections. Further, the wireless driver 126 may be configured to determine when the wireless chipset fails to transmit a data frame to the WAP during a key-exchange process, as introduced above and discussed in detail below.

The memory 124 may store a communication component 128, a credential component 130, a broadcast component 132, a password-validity component 134, a network-restart component 136, and one or more data stores 138, amongst other software and/or firmware, such as an operating system, other client applications, and the like. The communication component 128 may be configured to initiate a connection between the client device and the WAP 110 (or other WAPs) in response to a trigger, such as a request from a user, an application, or the like. The communication component 128 may be configured to instruct the wireless driver 126 to initiate the connection.

The credential component 130 may be configured to generate credential data, either in response to determining that a connection was unsuccessful (e.g., in response to receiving an indication from the WAP that an incorrect password was provided) or in response to receiving credential data from other devices 106 in the environment 102 and determining to respond to the other credential data. As introduced above and described in detail below, the credential component 130 may generate credential data comprise a current sequence number, a portion of a hash value of an SSID or other identifier of the WAP 110 (or other WAP), and a portion of a hash value of a password stored by the client device 106(1) in association with the WAP 110. The broadcast component 132, meanwhile, may broadcast this generated credential data, such as over a short-range wireless communication network (e.g., Bluetooth) or otherwise.

The password-validity component 134 may be configured to determine whether a password stored by the client device 106(1) in association with a particular WAP 110 is valid or invalid. In some instances, the password-validity component 134 may make this determination based on credential data received from other client devices in the environment 102. In other instances, the password-validity component 134 may make this determination based on information received (or not received) from the wireless driver 126 during a failed connection process. For instance, if the wireless driver outputs an indication (or is called via an API) that a data frame did not transmit during the key-exchange process with the WAP, then the password-validity component 134 may determine that the password may be valid. If no such indication is received (or determined via an API call), then the password-validity component 134 may determine that the password is likely invalid and may request that the user 104 re-enter the password, for instance. In the former instances, meanwhile, the network-restart component 136 may be configured to restart at least one network component of the client device, such as a network stack provided by the wireless chipset 122, in response to determining that that the connection problem may reside in the network stack rather than in the validity of the password.

The data stores 138, meanwhile, may store information related to current and/or previous connections between the client device 106 and/or the WAP 110 or other WAPs. For instance, the data stores 138 may store one or more SSIDs 140 or other WAP-identifiers, as well as corresponding passwords 142 stored in association with the respective SSIDs. As discussed above, a user 104 may have entered the passwords 142, the device 106(1) may have received the passwords 142 from other client devices 106 or a user account of the user 104 at a remote system 114, and/or the like.

In addition, the data stores 138 may store hash values (or partial hash values) of each SSID 144 and hash values (or partial hash values) of each password 146. For instance, the credential component 130 may generate these hash values 144 and 146 in response to determining that a network connection has failed or in response to receiving credential data from other client devices 106, or the credential component 130 may generate these hash values beforehand (e.g., in response to storing an SSID/password combination).

Before introducing, with reference to FIG. 2, the operations of the components illustrated in FIG. 1, it is to be appreciated that some or all of the instances of the components illustrated with reference to the client device 106(1) may also be stored on the other client devices 106. In addition, it is to be appreciated that the network(s) 112 which connect the client devices 106 to the remote systems 114 may represent an array or wired networks, wireless networks (e.g., WiFi), or combinations thereof. The remote systems 114 may comprise network-accessible systems—or "cloud-based systems"—implemented as computing infrastructures of processors, storage, software, data access, and so forth that is maintained and accessible via the network(s) 112, such as the Internet. Cloud-based systems may not require end-user knowledge of the physical location and configuration of the system that delivers the services. As illustrated, the remote systems 114 may comprise network-accessible resource(s), such as servers. Multiple of such resources may be included in each of the systems 114 and each may include processors and memory. As used herein, a processor may include a central processing unit (CPU) for processing data and memory may include computer-readable storage media storing computer-readable instructions that are executable on the respective processor(s). The computer-readable media may individually include volatile random access memory (RAM), non-volatile read only memory (ROM), non-volatile magnetoresistive (MRAM) and/or other types of memory.

Figure 2B:
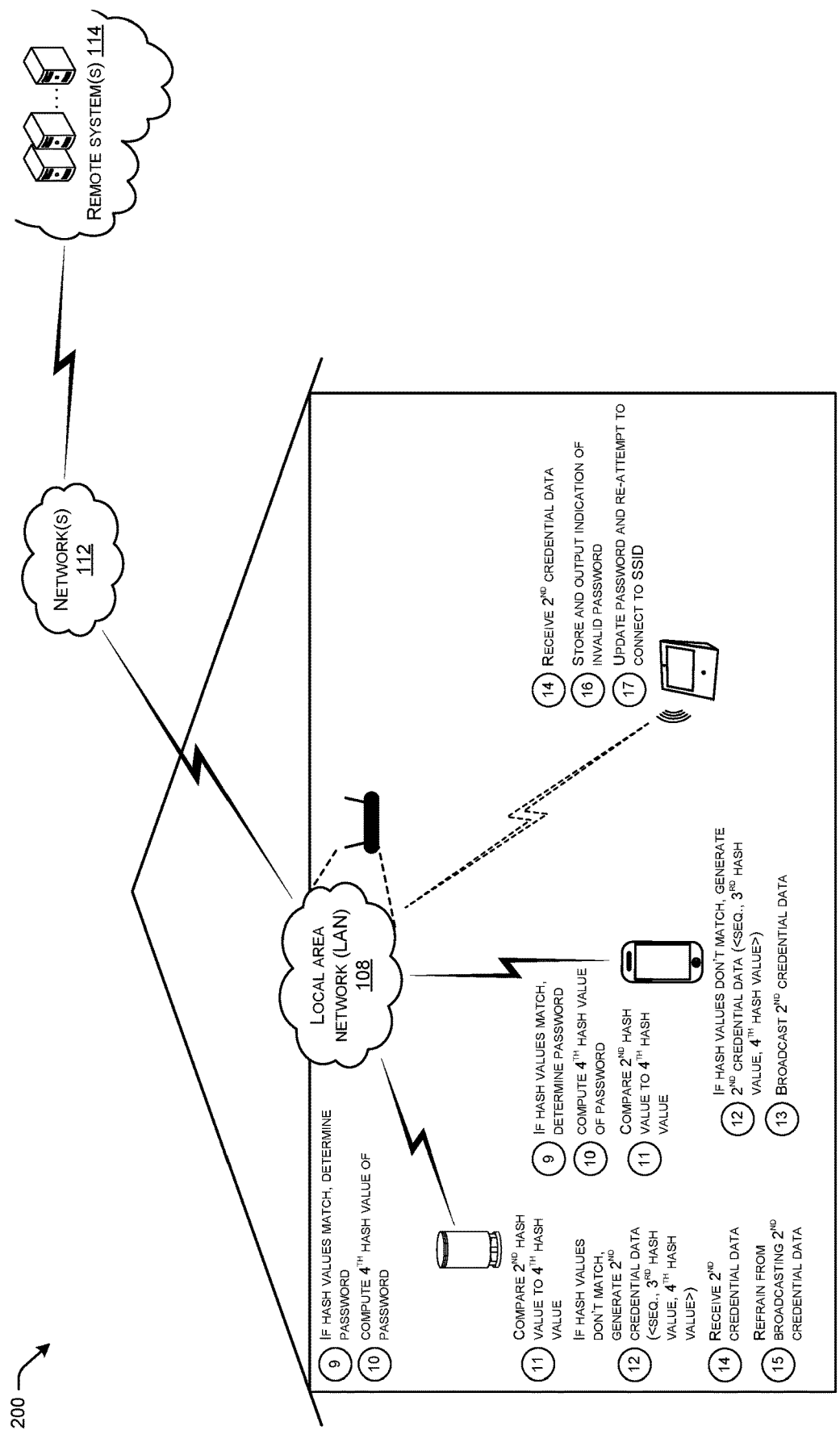

FIGS. 2A-B collectively illustrate a sequence of operations 200 that the components of the client device 106(1) and other client devices 106 may implement in the device environment 102 in response to a connection failure between the client device 106(1) and the WAP 110. At "1", the example client device 106(1) receives an indication of an incorrect password, such as from the WAP 110 in response to a failure during a key-exchange process between the WAP 110 and the client device 106(1). However, while this indication may accurately reflect that an incorrect password was provided to the WAP, in other instances this indication may be inaccurate and, instead, the connection failure may be based on a problem in a network component operating on the client device 106(1).

At "2", the client device 106(1) computes a first hash value of an SSID or other identifier associated with the WAP and stores this in the data stores 138. In some instances, this operation may comprise applying a predefined hash function to the SSID and storing, the data stores 138, a portion of the resulting hash value, such as the last four or "n" other digits of the hash value.

At "3", the client device 106(1) computes a second hash value of the password that the client device stores in association with the WAP 110. This second hash value, or a portion thereof, may be stored in the data stores 138. In some instances, this operation may comprise applying a predefined hash function to the password and storing, the data stores 138, a portion of the resulting hash value, such as the last four or "n" other digits of the hash value.

At "4", the client device 106(1) generates first credential data comprising a current sequence number, a portion of the first hash value, and a portion of the second hash value. For instance, each device 106 may be configured to maintain a counter of how many times devices have sent out credential data requesting confirmation of a password of a WAP. If, for instance, this is the first time that any of the devices have requested such confirmation, the sequence number may be set to one (1). The next occurrence may result in a client device setting the sequence number to two (2), and so forth.

At "5", the client device 106(1) broadcasts the first credential data within the device environment 102. In some instances, this operation may comprise broadcasting the first credential data via Bluetooth, WiFi, or any other communication channel. At "6", each of the client devices 106(2) and 106(N) receive the first credential data. While not illustrated in some instances the wireless access point 110 may also receive and identify the first credential data. At "7", each of these devices may determine, in response, the SSID of the WAP that they are currently connected to and/or the SSID of any WAPs stored in their memory, and may compute a third hash value of this SSID. That is, each of the client devices 106(2) and 106(N) may determine that they are connected to the WAP 110 and, thus, may determine the SSID of this WAP and may compute a third hash value by applying a predefined hash function to the SSID, with this predefined hash function between stored in each of the client devices 106. Further, while this example describes the client devices 106(2) and 106(N) computing the respective hash values of the SSID of the WAP to which they are connected, in some instances each of these devices may determine an SSID of multiple networks stored in their memory from prior connections. In this example, however, each device 106(2) and 106(N) identifies the SSID of the WAP 110 that they are currently connected to and computes a third hash value thereof. It is to be appreciated that because both devices are currently connected the same WAP, and because each of these client devices have been configured to use a predefined hash function, the resulting hash value (the "third hash value") may be the same value. Once computed, each device may store the third hash value, or a portion thereof (e.g., the last four digits) in the data stores 138.

At "8", each of the client devices may compare this third hash value (or a portion thereof) to the first hash value (or a portion thereof) provided in the first credential data to determine whether the client device 106(1) is inquiring about the WAP 110 to which the client devices 106(2) and 106(N) currently connect. If they do not match, then the device may either take no action or may identify another SSID stored in memory (if any), compute a corresponding hash value, and compare this hash value to the first hash value to determine whether there is a match. In this example, however, given that the client device 106(1) has failed to connect to the WAP 110 and has generated the first hash value using the SSID of the WAP 110, and because each of the devices 106(2) and 106(N) have also computed the third hash value using the same SSID, each device 106(2) and 106(N) may determine that the values match.

FIG. 2B continues the illustration of the sequence of operations 200 and includes, at "9", each of the devices 106(2) and 106(N) determining a respective password stored in the memory of each respective device in association with the WAP, given that the SSID hash values match the SSID hash value in the first credential data. At "10", each of the devices 106(2) and 106(N) compute a hash value of their respective passwords for the WAP 110. In this example, each of the devices 106(2) and 106(N) store the same password in association with the WAP 110 and, thus, FIG. 2B illustrates that each device computes a fourth hash value of the password.

At "11", each of the devices compares the fourth hash value (or a portion thereof) to the second hash value (or a portion thereof) in the first credential data. In this example, the passwords stored by the devices 106(2) and 106(N) in association with the WAP 110 differs from the password stored by the device 106(1) in association with the WAP 110 and, thus, each of the devices 106(2) and 106(N) may determine that the second and fourth hash values do not match.

At "12", and in response to making this determination, each of the devices 106(2) and 106(N) generate second credential data comprising the same sequence number as indicated in the first credential data (e.g., one (1)), as well as the third hash value (or a portion thereof), and the fourth hash value (or a portion thereof). At "13", in this example the client device 106(2) broadcasts this second credential data before the device 106(N) broadcasts the same credential data. Again, while not illustrated, in some instances the WAP 110 may perform some or all of the operations "7" through "13", as well as operations "14" and "15" described below. For instance, the WAP 110 may receive the first credential data, compute a hash value of its own SSID and compare this to the first hash value to determine whether the first credential data relates to the WAP 110 and, if so, compute a hash value of the actual password for accessing the WAP 110 with the hash value in the first credential data associated with the password being used by the client device 106(1). If these hash values differ, the WAP 110 may generate the second credential data (based on a portion of the hash value of the SSID and a portion of the hash value of the actual password of the WAP 110) and may send the second credential data to the client device 106(1) if other devices in the environment 102 have not already done so. In short, the WAP 110 may act similarly or the same as other devices 106 in the environment 102 in terms of aiding the client device 106(1) in determining whether or not it is using the correct password for connecting to the WAP 110.

At "14", both the client device 106(1) and the client device 106(N) receive the second credential data. At "15", the client device 106(N) analyzes the second credential data to identify that the sequence number contained therein is the same as the first credential data and, thus, is responsive to the first credential data. Therefore, given that another device (namely the device 106(2)) has sent second credential data responsive to the first credential data from the device 106(1), the client device 106(N) refrains from broadcasting the second credential data.

At "16", meanwhile, the client device 106(1) analyzes the second credential data to identify the same sequence number (e.g., one (1)) to determine that the second credential data is responsive to the first credential data. The client device 106(1) also analyzes the second credential data to determine, from the fourth hash value that differs from the second hash value, that the client device 106(2) stores a different password for the WAP 110 than the client device 106(1) stores for the WAP 110. Thus, the client device 106(1) may store an indication that the password is invalid and may output an indication of the invalid password to the user.

At "17", the client device 106(1) may update the password for the WAP 110 and re-attempt to connect to the SSID associated with the WAP. In some instances, the user 104 may re-enter the password into the client device 106(1). In other instances, the client device 106(1) may access the password from another client device or a remote system in a secure manner. In either instance, the sequence of operations 200 illustrates how the client device 106(1) is able to determine that a likelihood for the connection error is due to an incorrect password. Further, given that only hash values are broadcasted within the environment, the client device 106(1) is able to make this determination without jeopardizing the security of the passwords stored by the client devices 106.

Figure 3A:
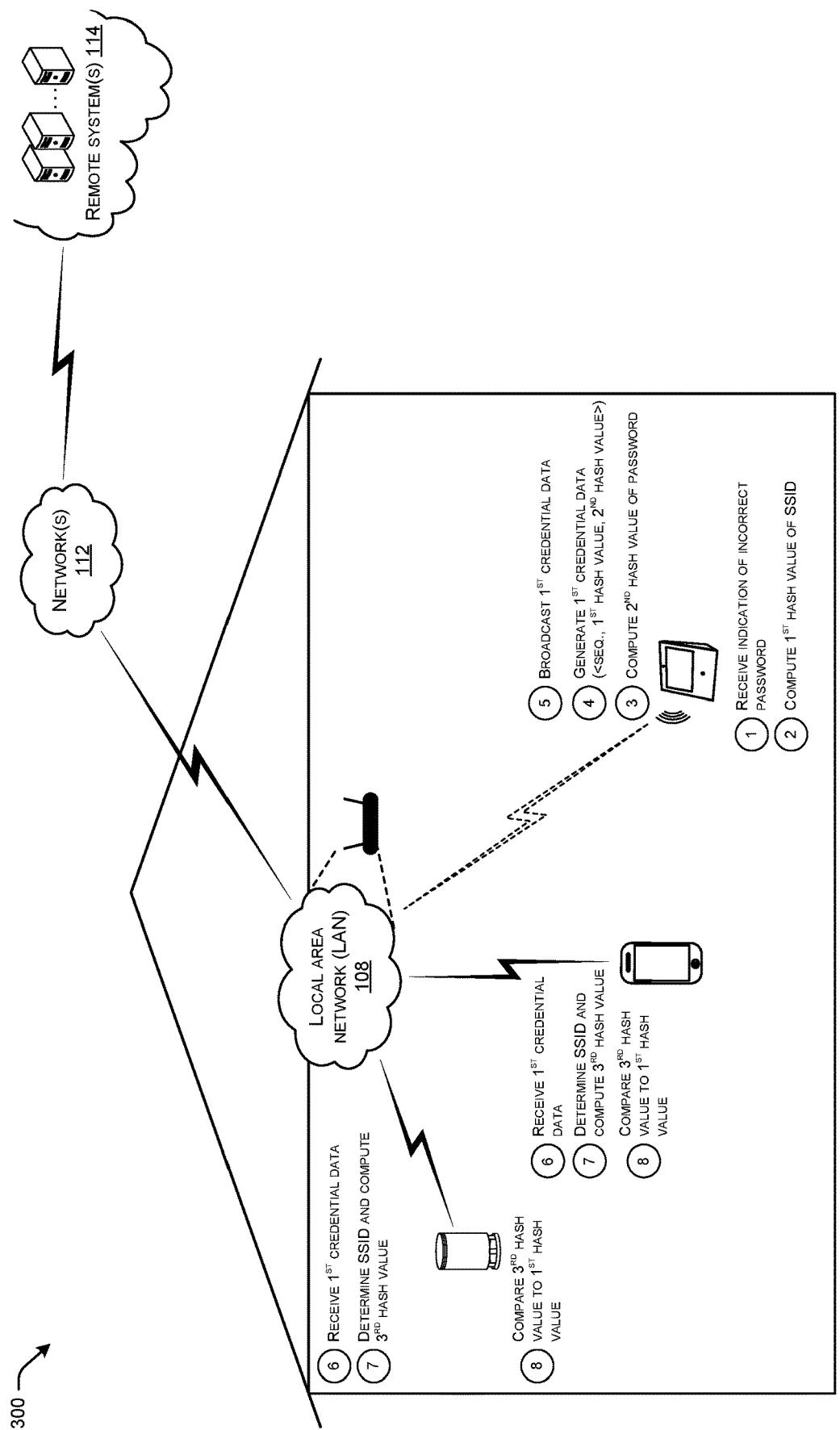
FIGS. 3A-B collectively illustrate another sequence of operations in which a first client device within the environment of FIG. 1 is unable to access the WAP using a password (input by a user or otherwise) and, in response, broadcasts a message to other client devices in the environment to determine whether they are using the same or different password. In this example, no client device in the environment indicates that it using a different password to access the same WAP and, thus, the first client device restarts one or more network components of the first client device in order to potentially cure any errors occurring in the network components.
Figure 3B:
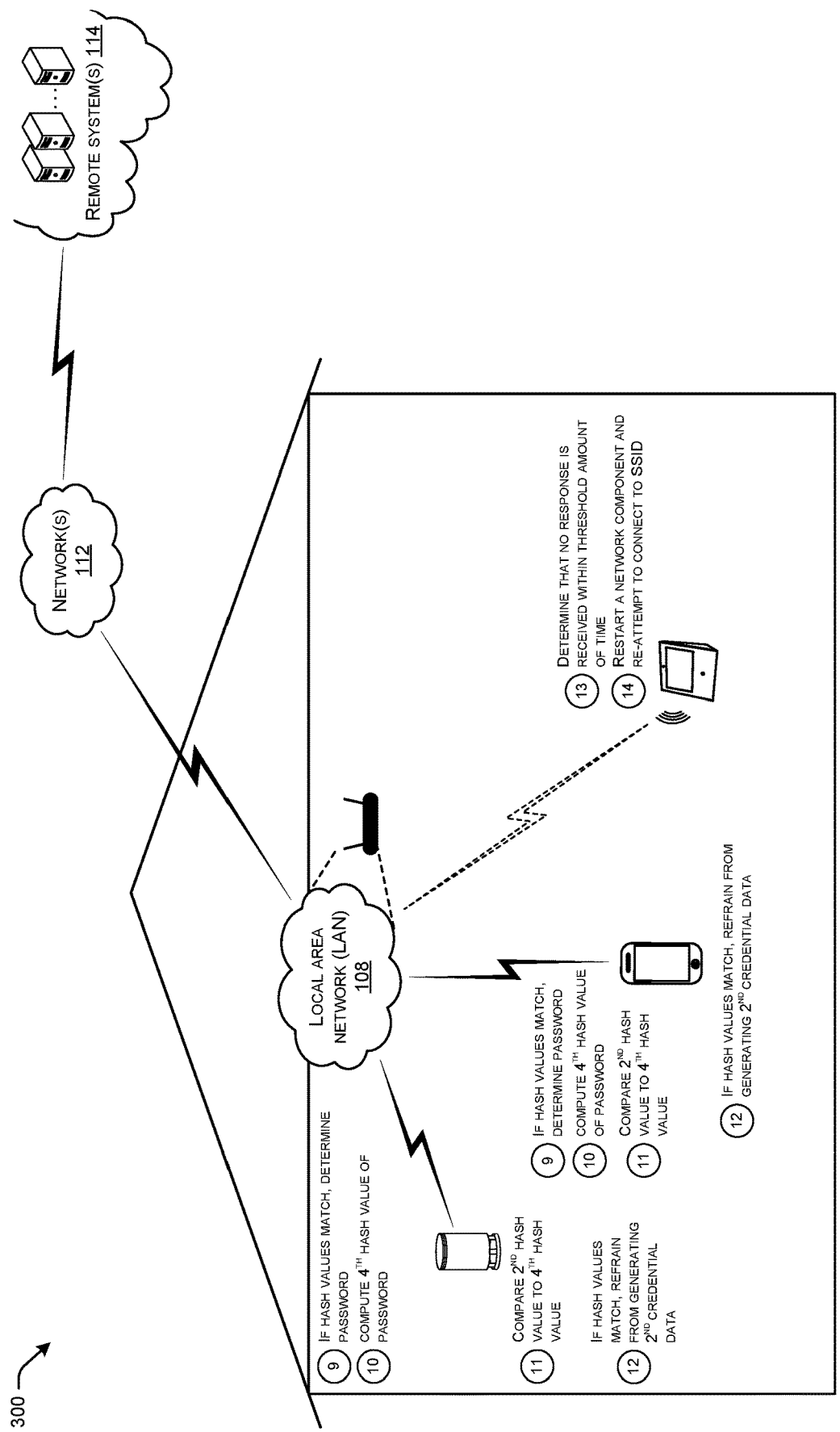

FIGS. 3A-B collectively illustrate a sequence of operations 300 that the components of the client device 106(1) and other client devices 106 may implement in the device environment 102 in response to a connection failure between the client device 106(1) and the WAP 110. In contrast to the sequence of operations 200 of FIGS. 2A-B, however, in this example the other client devices 106 in the environment utilize the same password for the WAP 110 as the client device 106(1) and, thus, the client device 106(1) determines that the connection failure is likely due to a problem in the network stack rather than based on an invalid password.

As described above, at "1", the example client device 106(1) receives an indication of an incorrect password, such as from the WAP 110 in response to a failure during a key-exchange process between the WAP 110 and the client device 106(1). However, while this indication may accurately reflect that an incorrect password was provided to the WAP, in this instance this indication is inaccurate and, instead, the connection failure is based on a problem in a network component operating on the client device 106(1).

At "2", the client device 106(1) computes a first hash value of an SSID or other identifier associated with the WAP and stores this in the data stores 138. In some instances, this operation may comprise applying a predefined hash function to the SSID and storing, the data stores 138, a portion of the resulting hash value, such as the last four or "n" other digits of the hash value.

At "3", the client device 106(1) computes a second hash value of the password that the client device stores in association with the WAP 110. This second hash value, or a portion thereof, may be stored in the data stores 138. In some instances, this operation may comprise applying a predefined hash function to the password and storing, the data stores 138, a portion of the resulting hash value, such as the last four or "n" other digits of the hash value.

At "4", the client device 106(1) generates first credential data comprising a current sequence number, a portion of the first hash value, and a portion of the second hash value. For instance, each device 106 may be configured to maintain a counter of how many times devices have sent out credential data requesting confirmation of a password of a WAP. If, for instance, this is the first time that any of the devices have requested such confirmation, the sequence number may be set to one (1). The next occurrence may result in a client device setting the sequence number to two (2), and so forth.

At "5", the client device 106(1) broadcasts the first credential data within the device environment 102. In some instances, this operation may comprise broadcasting the first credential data via Bluetooth, WiFi, or any other communication channel. At "6", each of the client devices 106(2) and 106(N) receive the first credential data and. At "7", each of these devices may determine, in response, the SSID of the WAP that they are currently connected to and/or the SSID of any WAPs stored in their memory, and may compute a third hash value of this SSID. That is, each of the client devices 106(2) and 106(N) may determine that they are connected to the WAP 110 and, thus, may determine the SSID of this WAP and may compute a third hash value by applying a predefined hash function to the SSID, with this predefined hash function between stored in each of the client devices 106. Further, while this example describes the client devices 106(2) and 106(N) computing the respective hash values of the SSID of the WAP to which they are connected, in some instances each of these devices may determine an SSID of multiple networks stored in their memory from prior connections. In this example, however, each device 106(2) and 106(N) identifies the SSID of the WAP 110 that they are currently connected to and computes a third hash value thereof. It is to be appreciated that because both devices are currently connected the same WAP, and because each of these client devices have been configured to use a predefined hash function, the resulting hash value (the "third hash value") may be the same value. Once computed, each device may store the third hash value, or a portion thereof (e.g., the last four digits) in the data stores 138.

At "8", each of the client devices may compare this third hash value (or a portion thereof) to the first hash value (or a portion thereof) provided in the first credential data to determine whether the client device 106(1) is inquiring about the WAP 110 to which the client devices 106(2) and 106(N) currently connect. If they do not match, then the device may either take no action or may identify another SSID stored in memory (if any), compute a corresponding hash value, and compare this hash value to the first hash value to determine whether there is a match. In this example, however, given that the client device 106(1) has failed to connect to the WAP 110 and has generated the first hash value using the SSID of the WAP 110, and because each of the devices 106(2) and 106(N) have also computed the third hash value using the same SSID, each device 106(2) and 106(N) may determine that the values match.

FIG. 3B continues the illustration of the sequence of operations 300 and includes, at "9", each of the devices 106(2) and 106(N) determining a respective password stored in the memory of each respective device in association with the WAP, given that the SSID hash values match the SSID hash value in the first credential data. At "10", each of the devices 106(2) and 106(N) compute a hash value of their respective passwords for the WAP 110. In this example, each of the devices 106(2) and 106(N) store the same password in association with the WAP 110 and, thus, FIG. 3B illustrates that each device computes a fourth hash value of the password.

At "11", each of the devices compare the fourth hash value (or a portion thereof) to the second hash value (or a portion thereof) in the first credential data. In this example, the passwords stored by the devices 106(2) and 106(N) in association with the WAP 110 is the same as the password stored by the device 106(1) in association with the WAP 110 and, thus, each of the devices 106(2) and 106(N) may determine that the second and fourth hash values match. In response to determining that these hash values match, at "12", each of the client devices 106(2) and 106(N) refrain from generating and/or sending second credential data.

At "13", meanwhile, the client device 106(1) determines that no response to the first credential data is received within a threshold amount of time from sending the first credential data. Thus, the client device 106(1) determines that each other client device in the environment 102 utilizes the same password for the WAP 110 as the client device 106(1). Thus, the client device 106(1) is configured to determine that the password is likely correct and, thus, the client device 106(1) may refrain from outputting an indication that the password is invalid. In addition, or in the alternative, at "14" the client device 106(1) may restart a network component (e.g., the wireless chipset 122) of the client device 106(1) and may re-attempt to connect to the S SID associated with the WAP 110.

Figure 4A:
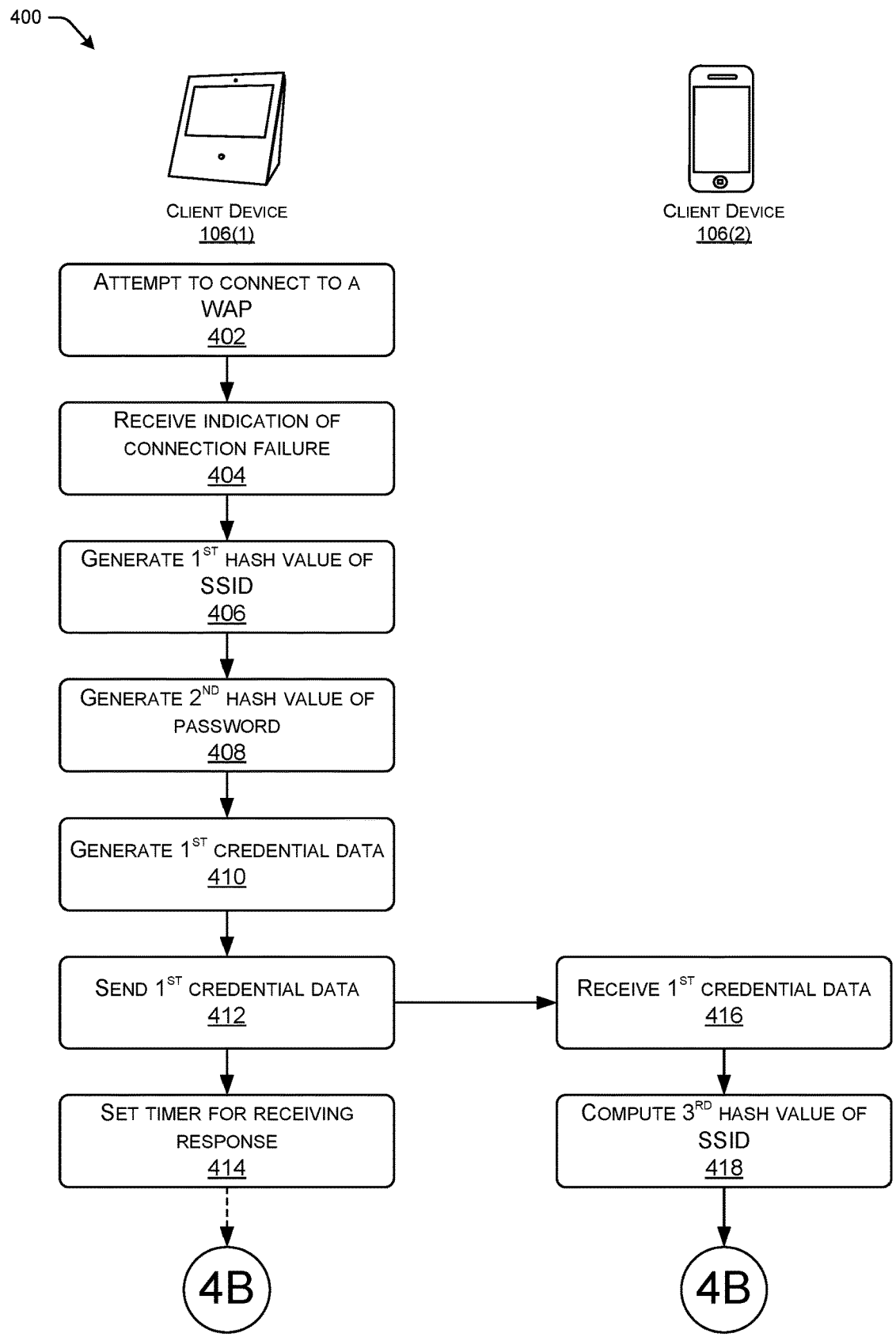
FIGS. 4A-C collectively illustrate a flow diagram of an example process in which a first client device is unable to access the WAP using a password and, in response, sends a message to a second client device to determine whether the second client device is using a different password. In response to determining that the second client device is using a different password, the first client device may request a new password from a user.
Figure 4B:
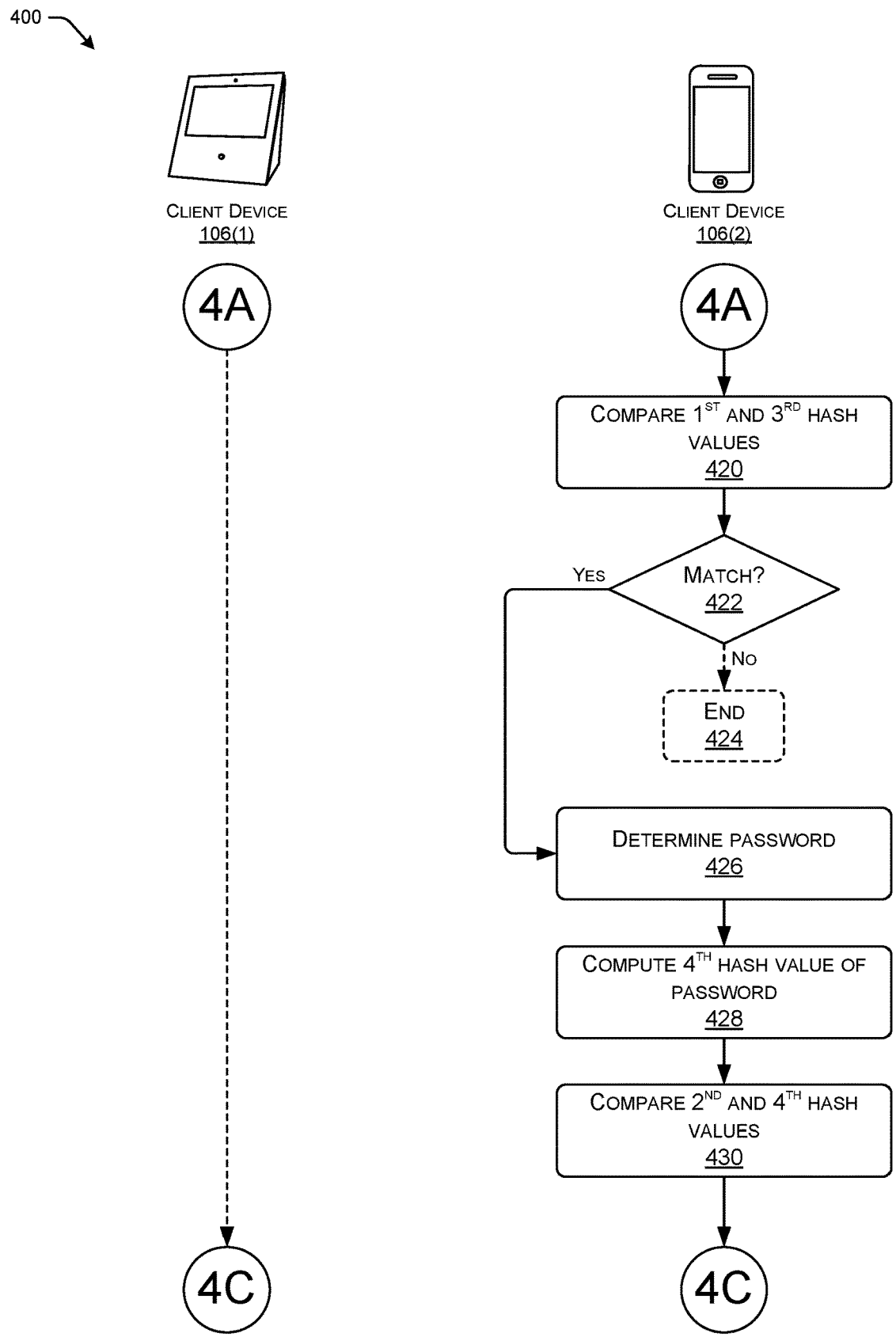
Figure 4C:
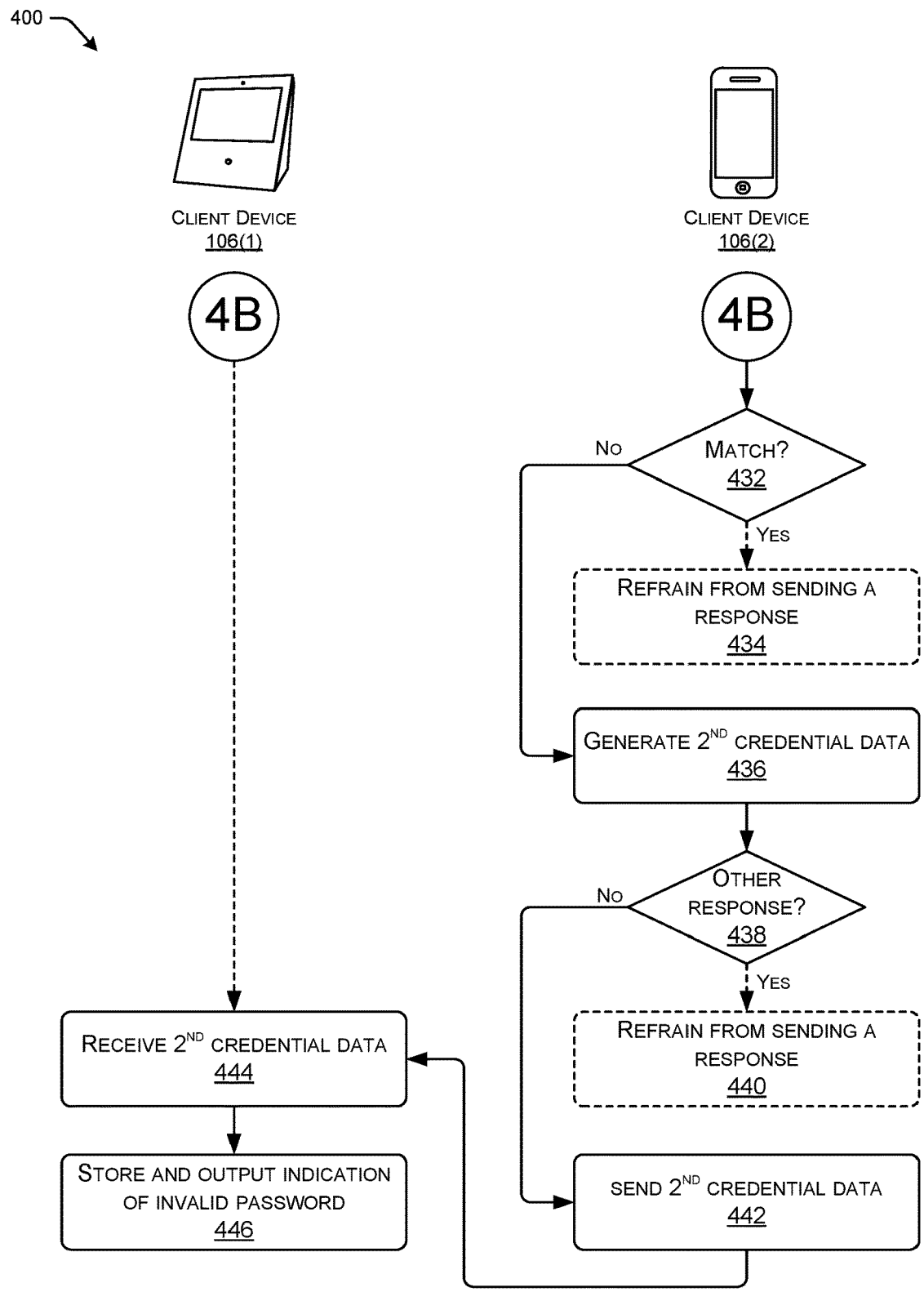

FIGS. 4A-C collectively illustrate a flow diagram of an example process 400 in which a first client device 106(1) is unable to access the WAP using a password and, in response, sends a message to a second client device 106(2) to determine whether the second client device is using a different password. In response to determining that the second client device 106(2) is using a different password, the first client device 106(1) may request a new password from a user.

The process 400 and other processes described herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. Finally, while some of the operations are described as being performed by certain devices or components in these examples, it is to be appreciated that other devices and components may perform some or all of these operations in other instances.

At an operation 402, the first client device 106(1) may attempt to connect to a WAP in an environment of the first client device 106(1). At an operation 404, the first client device 106(1) may receive an indication, from the WAP or otherwise, of a connection failure. In response, at an operation 406 the first client device 106(1) generates a first hash value of an SSID of the WAP and, at an operation 408, generates a second hash value of the password that the first client device 106(1) stores in association with the WAP (i.e., the password that the first client device 106(1) used to attempt to connect to the WAP at the operation 402).

At an operation 410, the first client device 106(1) generates first credential data, which may comprise a current sequence number, at least a portion of the first hash value, and at least a portion of the second hash value. At an operation 412, the first client device 106(1) sends the first credential to at least the second client device 106(2). In some instances, the first client device 106(1) broadcasts the first credential data, while in other instances the first client device 106(1) sends the first credential data directly to the second client device 106(2). After sending the first credential data, at an operation 414 the first client device 106(1) sets a timer for receiving a response from the second client device 106(2) or another client device in the environment 102. Upon expiration of the timer, and not receiving a response, the first client device 106(1) may determine that the password is likely invalid. This use case is described with reference to FIGS. 5A-C.

At an operation 416, the second client device receives the first credential data from the first client device 106(1). At an operation 418, the second client device 106(2) computes a third hash value of an SSID, such as an SSID of a WAP in the environment that the second client device 106(2) is currently connected to.

FIG. 4B continues the illustration of the process 400 and includes, at an operation 420, the second client device 106(2) comparing at least a portion of the first hash value from the first credential data to at least a portion of the third hash value. At an operation 422, the second client device 106(2) determines whether these hash values match. If not, the process ends at 424. If so, meaning that the first client device 106(1) is attempting to learn about the same WAP to which the second client device 106(2) is currently connected, then at an operation 426 the second client device 106(2) may determine the password that it currently stores in association with the SSID.

At an operation 428, the second client device 106(2) computes a fourth hash value of the password determined at the operation 426. At an operation 430, the second client device 106(2) compares at least a portion of the second hash value from the first credential data to at least a portion of the fourth hash value.

FIG. 4C continues the illustration of the process 400 and includes, at an operation 432, the second client device 106(2) determining whether the second and fourth hash values match. If they do match, meaning the passwords used by the first and second devices are the same, then the second client device 106(2) refrains from sending a response to the first client device at an operation 434. In this example, however, the second client device 106(2) determines that these hash values do not match and, thus, at an operation 436, the second client device 106(2) generates second credential data. The second credential data may comprise the same sequence number as the first credential data, at least a portion of the third has value, and at least a portion of the fourth hash value.

At an operation 438, the second client device 106(2) determines whether another response has been received from another client device in the environment. That is, the second client device 106(2) may determine whether another device has already broadcast or otherwise sent credential data to the first client device 106(1) indicating that the other client device is using a different password than the first client device 106(1) for the same SSID/WAP. If so, then at an operation 440 the second client device 106(2) refrains from sending a response to the first credential data. In this example, however, the second client device 106(2) determines that no response has been received and, thus, at an operation 442 the second client device 106(2) sends the second credential data to the first client device 106(1). This may comprise broadcasting the second credential data or sending the second credential data directly to the first client device 106(1).

At an operation 444, the first client device receives the second credential data and determines, based on the sequence number therein, that the second credential data is responsive to the first credential data. In addition, the first client device 106(1) may determine, from the third and fourth hash values or from the receipt of the second credential data alone, that the second client device 106(2) is using a different password than the first client device 106(1) for the same SSID/WAP. Thus, at an operation 446, the first client device 106(1) may store an indication that the password is invalid for the WAP and/or output a corresponding indication. In some instances, the first client device 106(1) may also attempt to receive the correct password, from a user of the device, a peer client device, a user account, or the like.

Figure 5A:
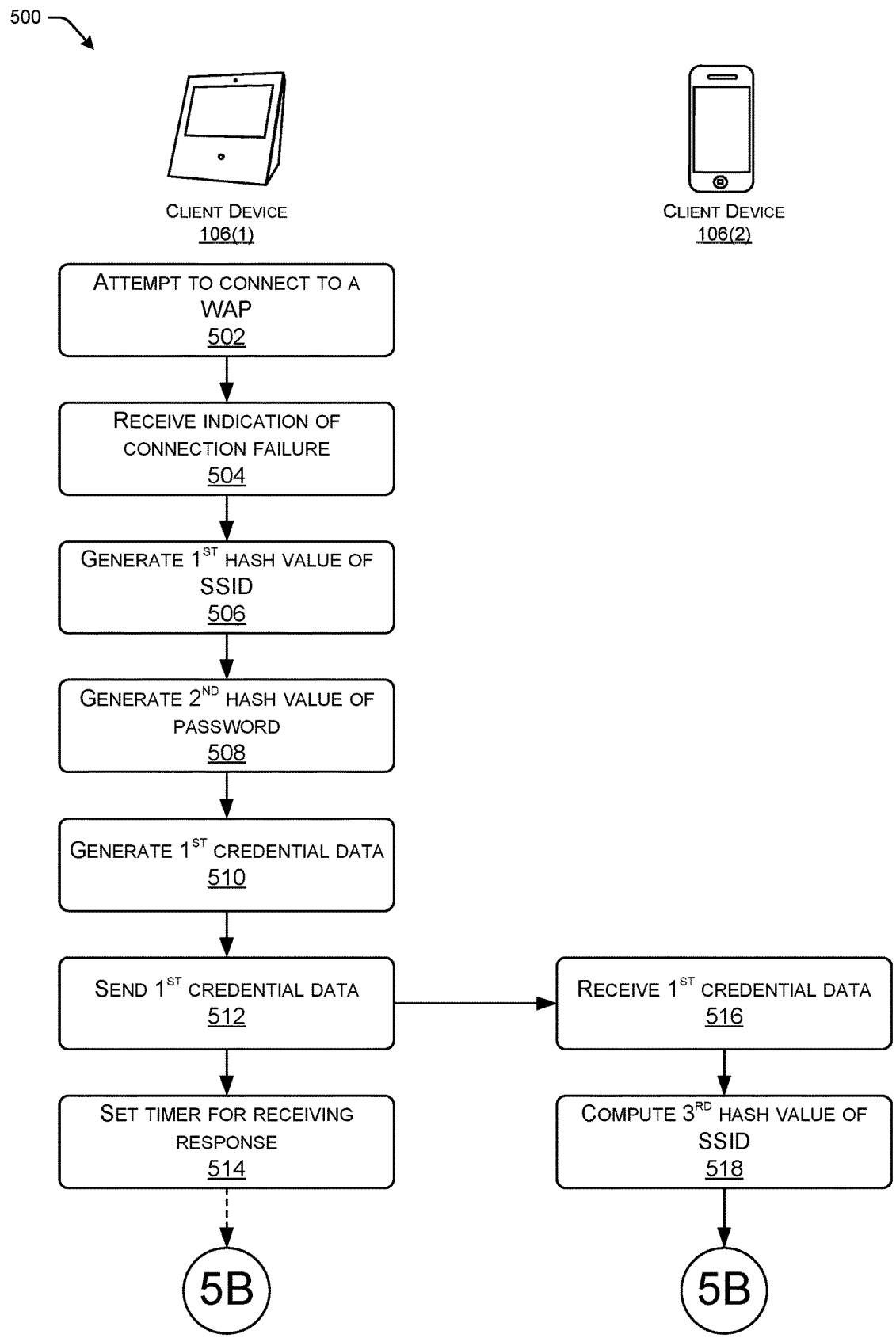
Figure 5B:
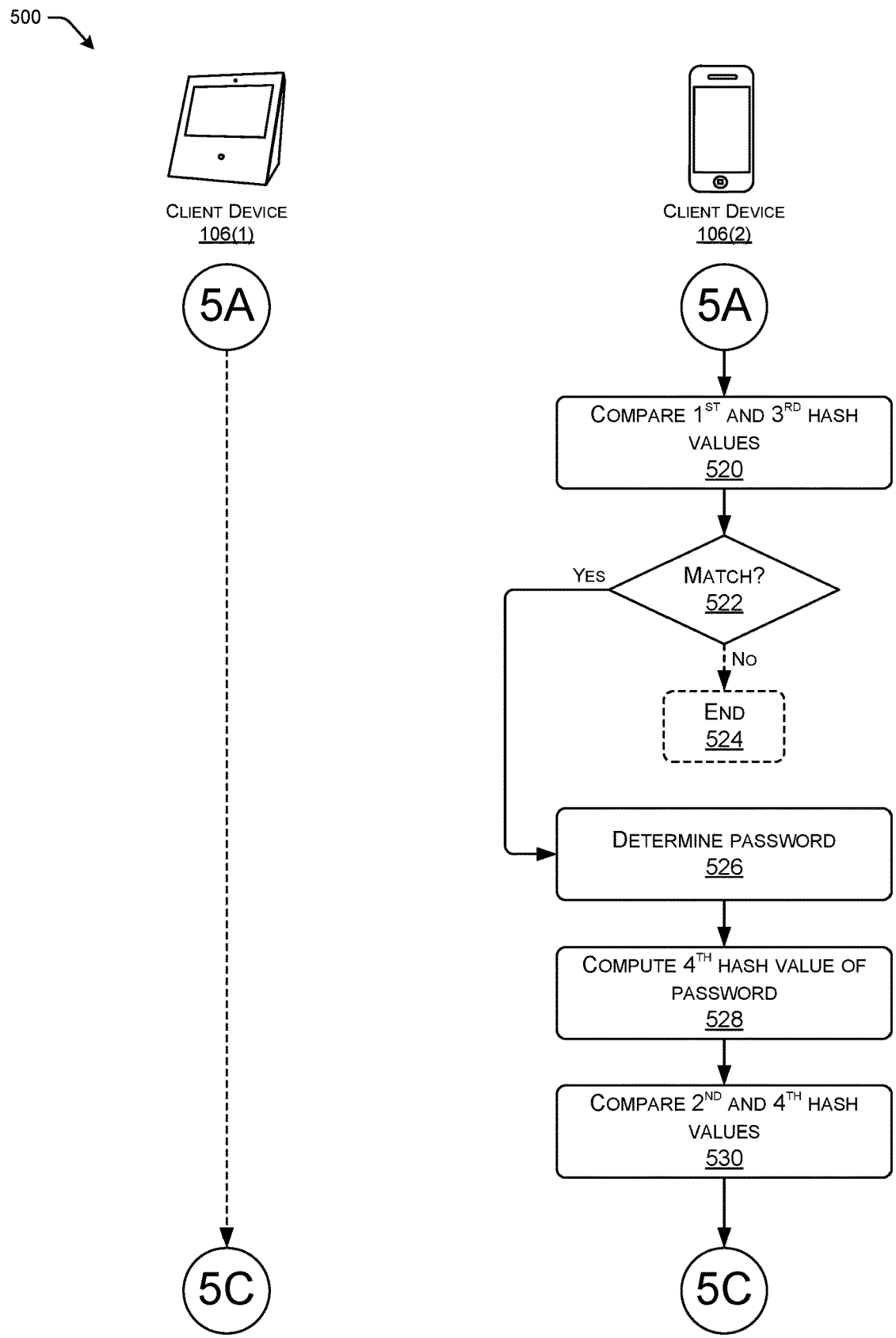
Figure 5C:
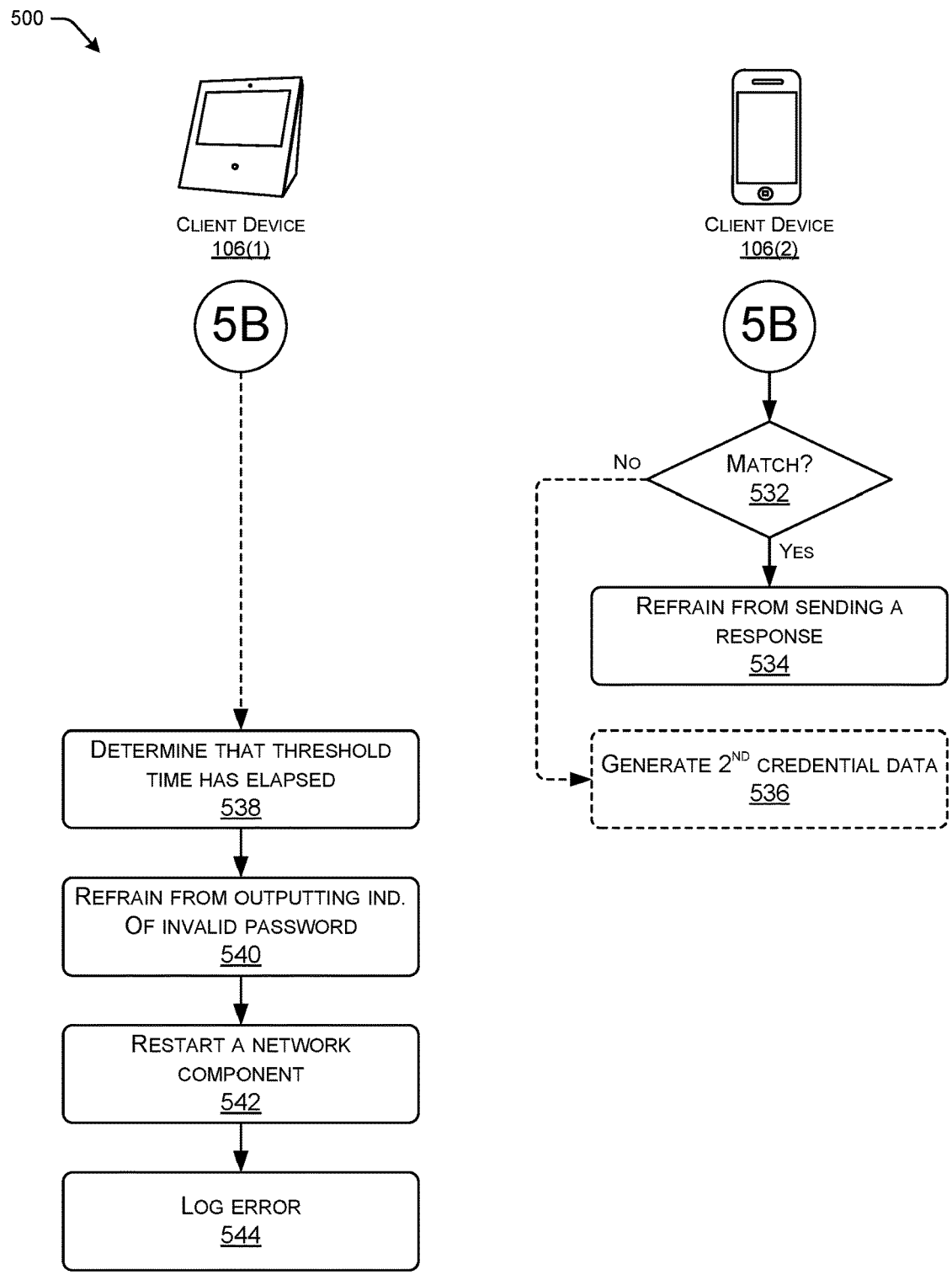

FIGS. 5A-C collectively illustrate a flow diagram of another example process 500 in which the first client device 106(1) is unable to access the WAP using a password and, in response, sends a message to the second client device 106(2) to determine whether the second client device 106(2) is using a different password. In response to determining that the second client device 106(2) is not using a different password, the first client device 106(1) may perform one or more actions, such as restarting a network component, logging the error, or the like.

At an operation 502, the first client device 106(1) may attempt to connect to a WAP in an environment of the first client device 106(1). At an operation 504, the first client device 106(1) may receive an indication, from the WAP or otherwise, of a connection failure. In response, at an operation 506 the first client device 106(1) generates a first hash value of an SSID of the WAP and, at an operation 508, generates a second hash value of the password that the first client device 106(1) stores in association with the WAP (i.e., the password that the first client device 106(1) used to attempt to connect to the WAP at the operation 402).

At an operation 510, the first client device 106(1) generates first credential data, which may comprise a current sequence number, at least a portion of the first hash value, and at least a portion of the second hash value. At an operation 512, the first client device 106(1) sends the first credential to at least the second client device 106(2). In some instances, the first client device 106(1) broadcasts the first credential data, while in other instances the first client device 106(1) sends the first credential data directly to the second client device 106(2). After sending the first credential data, at an operation 514 the first client device 106(1) sets a timer for receiving a response from the second client device 106(2) or another client device in the environment 102. Upon expiration of the timer, and not receiving a response, the first client device 106(1) may determine that the password is likely invalid.

At an operation 516, the second client device receives the first credential data from the first client device 106(1). At an operation 518, the second client device 106(2) computes a third hash value of an SSID, such as an SSID of a WAP in the environment that the second client device 106(2) is currently connected to.

FIG. 5B continues the illustration of the process 500 and includes, at an operation 520, the second client device 106(2) comparing at least a portion of the first hash value from the first credential data to at least a portion of the third hash value. At an operation 522, the second client device 106(2) determines whether these hash values match. If not, the process ends at 524. If so, meaning that the first client device 106(1) is attempting to learn about the same WAP to which the second client device 106(2) is currently connected, then at an operation 526 the second client device 106(2) may determine the password that it currently stores in association with the SSID.

At an operation 528, the second client device 106(2) computes a fourth hash value of the password determined at the operation 526. At an operation 530, the second client device 106(2) compares at least a portion of the second hash value from the first credential data to at least a portion of the fourth hash value.

FIG. 5C continues the illustration of the process 500 and includes, at an operation 532, the second client device 106(2) determining whether the second and fourth hash values match. In this example, these values match, meaning the passwords used by the first and second devices are the same. Thus, at an operation 534, the second client device 106(2) refrains from sending a response to the first client device 106(1). Again, if the values did not match, then the second client device 106(2) would generate the second credential data at an operation 536, as described above with reference to the process 400.

At an operation 538, the first client device 106(1) determines that the threshold amount of time measured by the timer set at the operation 514 has elapsed without receiving a response from the second client device 106(2) (or any other client device in the environment). Thus, at an operation 540, the client device 106(1) determines that the password that it stores is likely correct and, thus, the client device 106(1) refrains from outputting an indication of an invalid password. In addition, at an operation 542, the first client device 106(1) restarts at least one network component to attempt to fix any potential issues in the network stack of the wireless chipset 122. At an operation 544, the first client device 106(1) may also log an indication of the likely error in the network stack.

Figure 6A:
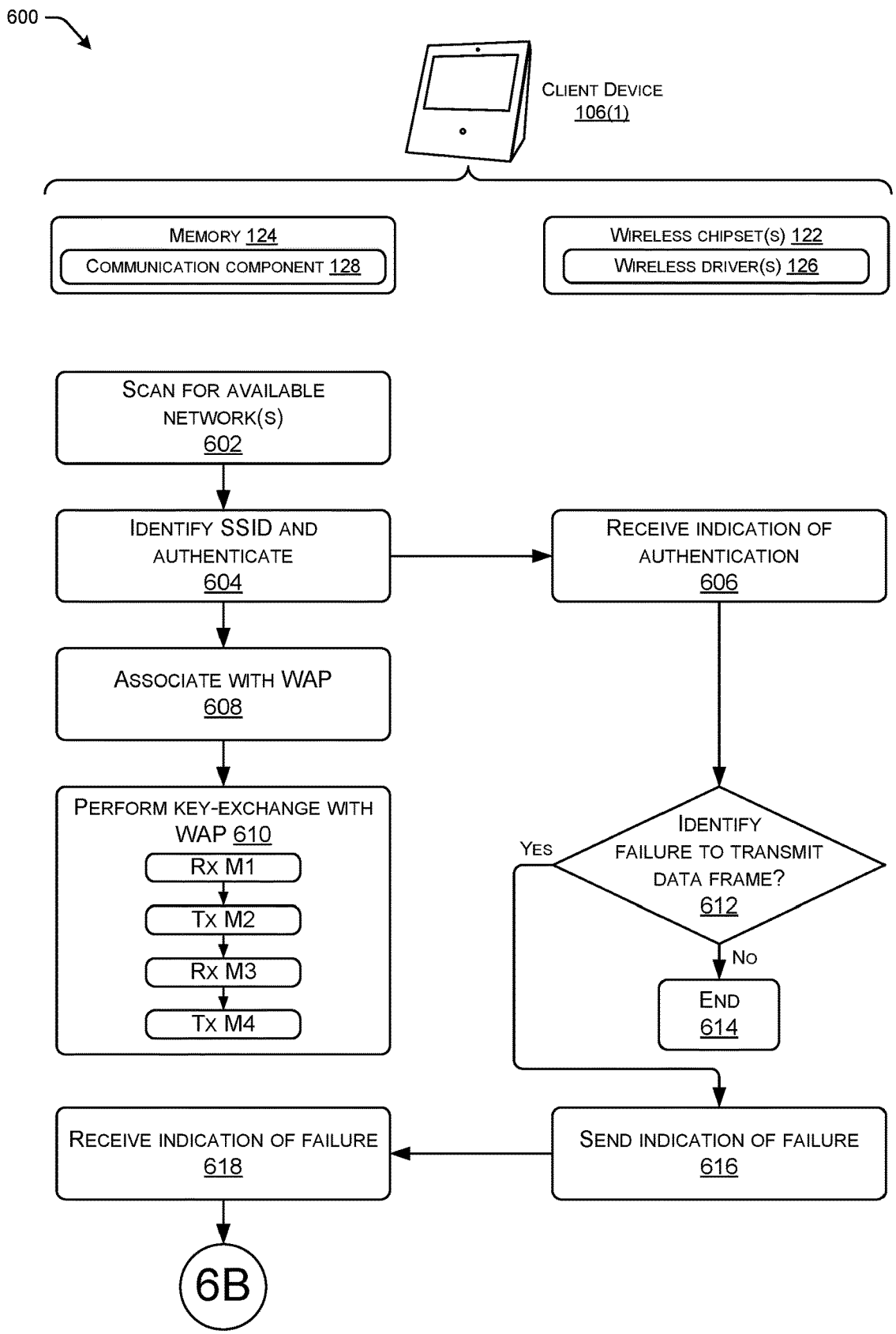
FIGS. 6A-C collectively illustrate a flow diagram of another example process in which a wireless driver of a wireless chipset of a client device has been configured to output an indication to software of the client device when the client device fails to transmit one or more frames as part of a key-exchange process with the WAP. In response to a timeout condition occurring during a failed connection attempt with the WAP, the client device may determine whether such an indication has been received and, if so, the client device may restart a network component or perform other actions. In response to determining that no such indication has been received, the client device may request a new password for the WAP from a user of the client device.
Figure 6B:
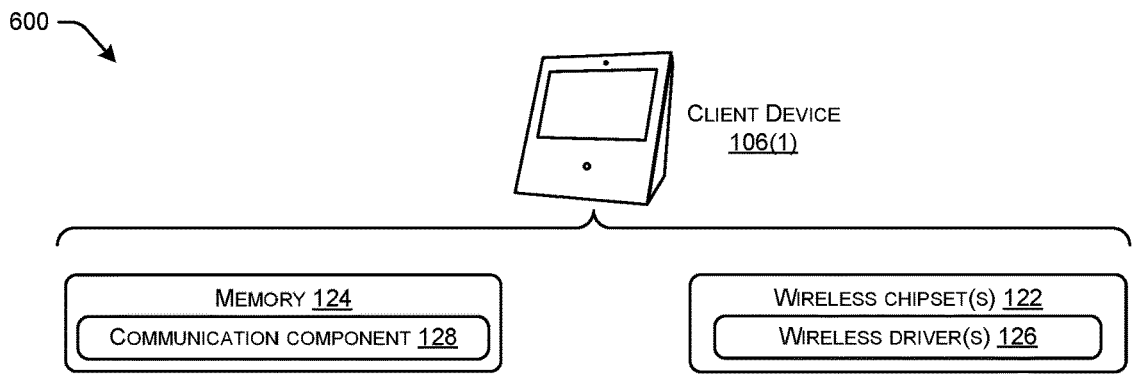
Figure 6B:
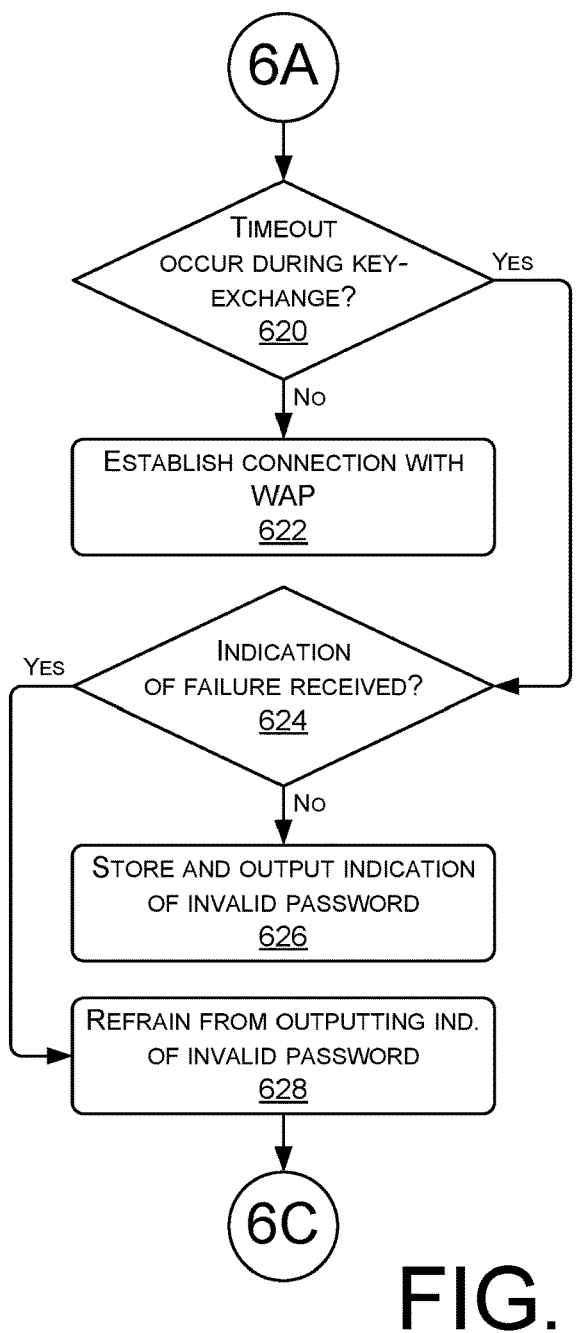
Figure 6C:
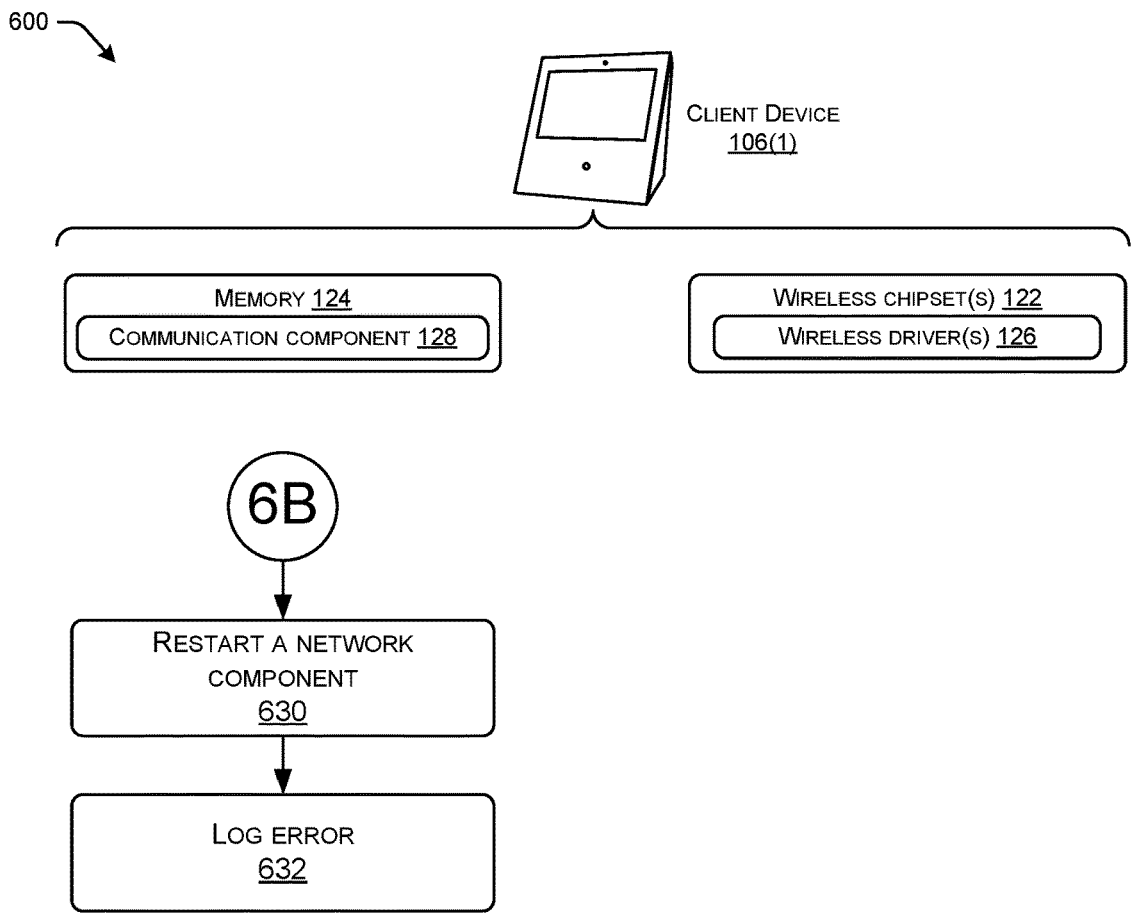

FIGS. 6A-C collectively illustrate a flow diagram of another example process 600 in which a wireless driver 126 of a wireless chipset 122 of a client device 106(1) has been configured to output an indication to software of the client device 106(1) when the client device 106(1) fails to transmit one or more frames as part of a key-exchange process with the WAP 110. In response to a timeout condition occurring during a failed connection attempt with the WAP 110, the client device 106(1) may determine whether such an indication has been received and, if so, the client device 106(1) may restart a network component or perform other actions. In response to determining that no such indication has been received, the client device 106(1) may request a new password for the WAP 110 from a user of the client device 106(1).

At an operation 602, the communication component 128 or another component of the client device 106(1) may scan for available networks within the environment 102. For instance, the communication component 128 may instruct the wireless chipset 122 to perform such a scan for determining which networks available to the client device 106(1). At an operation 604, the communication component 128 or another component of the client device 106(1) may identify the SSID of the example WAP 110 and attempt to authenticate with the WAP. This authentication may comprise the client device 106(1) sending data identifying the device (e.g., a MAC address of the client device 106(1)) and data indicating that the client device 106(1) would like associate with the WAP 110. If successful, the WAP 110 may send an acknowledgment of the request. At an operation 606, the wireless driver 126 receives an indication of an authentication response from the WAP 110.

At an operation 608, the client device 106(1) attempts to associate with the WAP 110. This operation may comprise the client device and the WAP negotiating capabilities with one another. If successful, then the process 600 may move to performing a key-exchange with the WAP 110, during which time the client device 106(1) sends one or more data frames based on the password stored at the client device 106(1) in association with the WAP 110. Thus, if the client device 106(1) sends the correct password to the WAP 110, then the client device 106(1) and the WAP 110 may successfully establish a connection. However, and as noted above, problems in the network stack of the client device 106(1) may result in the client device 106(1) and/or the WAP incorrectly assuming that the password is incorrect. Thus, the wireless driver 126 may be configured to identify when the client device 106(1) fails to send a data frame as part of the key-exchange process and, in response to transmit an indication of the failure to the communication component 128 or another component of the client device 106(1).

At an operation 612, therefore, the wireless driver 126 determines whether it has identified a failure to transmit a data frame. This failure may be based on the data frame being filtered from the buffer before sending, based on buffer saturation, based on not being able to receive an ack message from WAP 110, and/or the like. If no such failure is identified by the wireless driver 126, then the wireless driver determination ends at 614. If however, such a failure is identified, then the wireless driver 126 may send an indication of the failure to the communication component 128 or another component of the client device 106(1) at an operation 616. At an operation 618, the communication component 128 or another component of the client device 106(1) may receive the indication.

FIG. 6B continues the illustration of the process 600 and includes, at an operation 620, the communication component 128 or another component of the client device 106(1) determining whether a timeout has occurred during the key-exchange process. If not, then at an operation 622 the client device 106(1) and the WAP 110 may establish a successful connection. If a timeout occurs, however, then at an operation 624 the communication component 128 or another component of the client device 106(1) determines whether an indication of a transmission failure has been received from the wireless driver 126. If not, then at an operation 626 the communication component 128 or another component of the client device 106(1) may store an indication that the password used by the client device 106(1) is incorrect and/or may output such an indication. The client device 106(1) may also perform an operation to attempt to receive a new and valid password, as described above. If, however, an indication of a transmission failure has been received, then at an operation 628 the communication component 128 or another component of the client device 106(1) may refrain from outputting an indication of an invalid password, given that the connection failure may be due to a problem in the network stack.

FIG. 6C continues the illustration of the process 600 and includes, at an operation 630, the communication component 128 or another component of the client device 106(1) restarting at least one network component of the client device 106(1), such as the wireless chipset 122 or the like. In addition, or in the alternative, the client device 106(1) may store an indication of the error at an operation 632.

Figure 7:
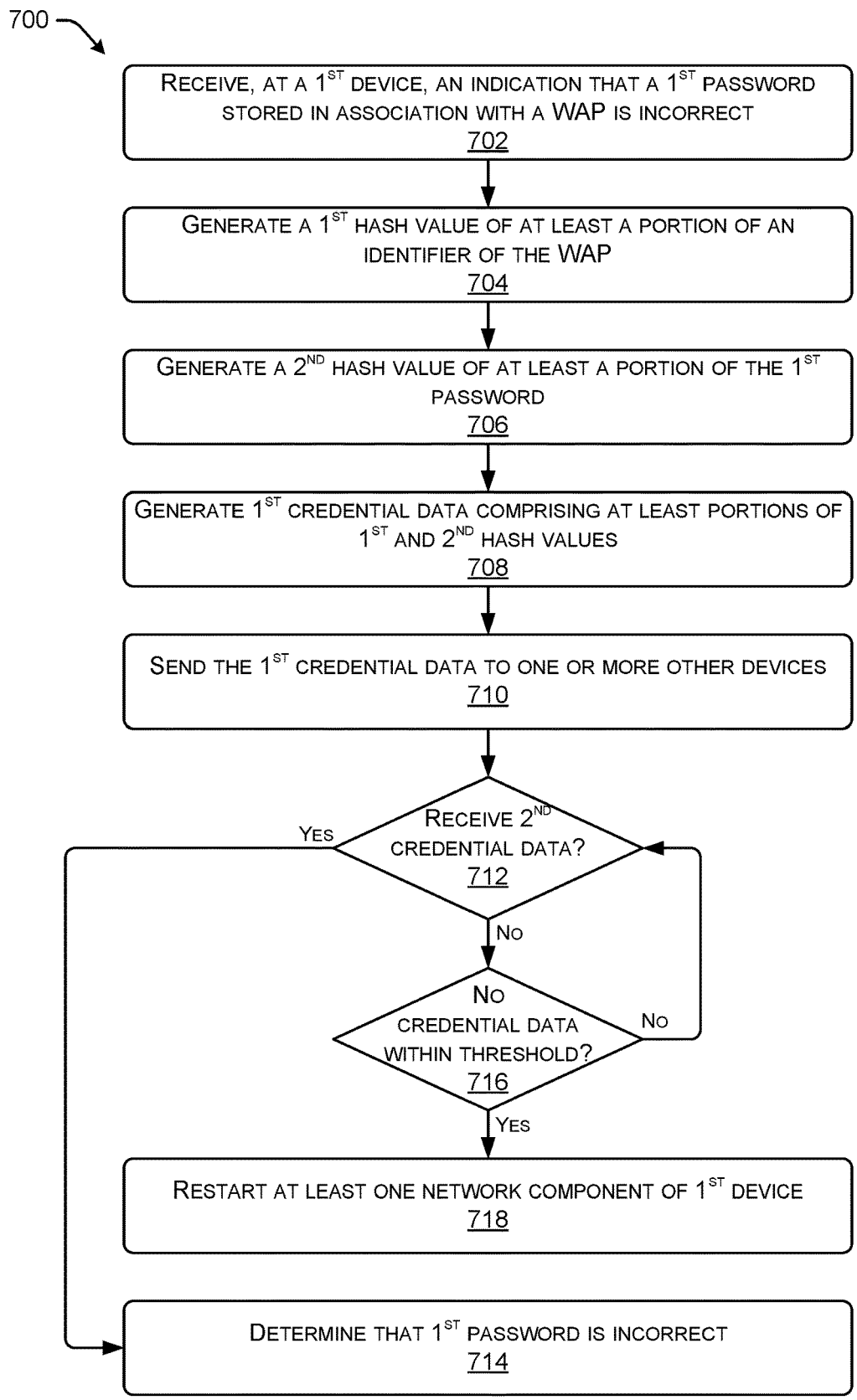
FIG. 7 illustrates a flow diagram of another example process in which a first device determines whether to restart a network component or request a new network password in response to failing to establish a connection with a WAP.

FIG. 7 illustrates a flow diagram of another example process 700 in which a first device determines whether to restart a network component or request a new network password in response to failing to establish a connection with a WAP. At an operation 702, a first electronic receives an indication that a first password stored by the first electronic device in association with a wireless access point (WAP) is incorrect. At an operation 704, the first electronic device generates a first hash value of at least a portion of an identifier associated with the WAP. At an operation 706, the first electronic device generates a second hash value of at least a portion of the first password and, at an operation 708, generates first credential data comprising at least a portion of the first hash value and a least a portion of the second hash value. At an operation 710, the first electronic device sends the first credential data to one or more other electronic devices in an environment of the first electronic device.

At an operation 712, the first electronic device determines whether it has received from a second electronic device of the one or more other electronic devices, second credential data comprising: (i) at least a portion of the first hash value, and (ii) at least a portion of a third hash value of at least a portion of a second password stored by the second electronic device in association with the WAP. If so, then at an operation 714 the first electronic device determines, based at least in part on receiving the second credential data, that the first password is incorrect.

If the second credential data is not received, however, then at an operation 716 the first electronic device determines whether no credential data has been received from the one or more other electronic devices within a threshold amount of time from the sending of the third credential data. If so, meaning that the threshold amount of time has elapsed, then at an operation 718 the first electronic device restarts at least one wireless-network component of the first electronic device at least partly in response to determining that credential data has not been received from the one or more other electronic devices within the threshold amount of time. If the threshold amount of time has not elapsed, then the process 700 may return to the operation 712.

Figure 8:
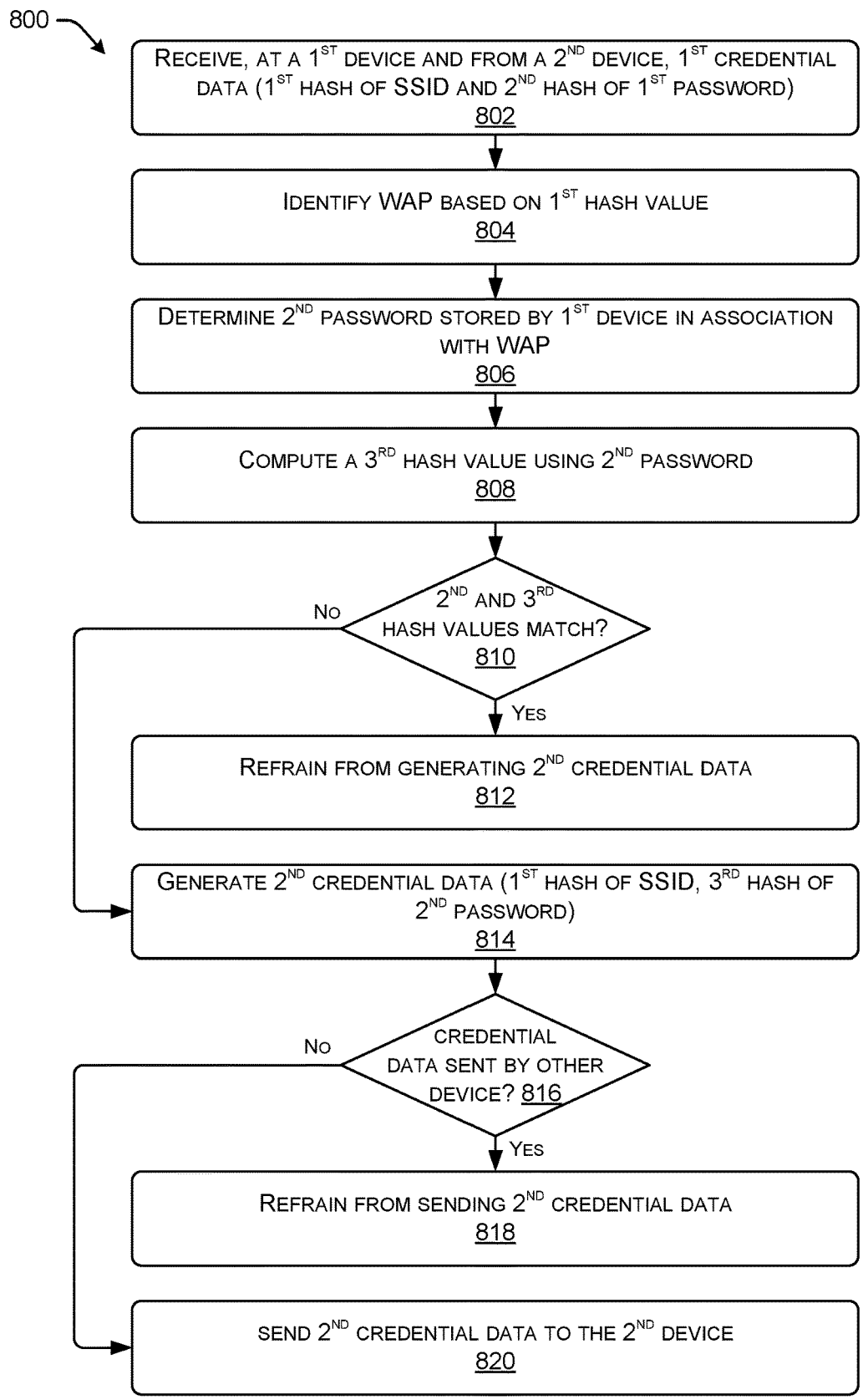
FIG. 8 illustrates a flow diagram of another example process in which a first device in an environment receives, from a second device in the environment, an indication that the first device has failed to connect with a WAP and an indication of a password used by the first device to attempt to establish the connection. In response to receiving this information, the first device may determine whether it is using the same or different password to access the WAP and respond (or refrain from responding) accordingly.

FIG. 8 illustrates a flow diagram of another example process 800 in which a first device in an environment receives, from a second device in the environment, an indication that the first device has failed to connect with a WAP and an indication of a password used by the first device to attempt to establish the connection. In response to receiving this information, the first device may determine whether it is using the same or different password to access the WAP and respond (or refrain from responding) accordingly.

At an operation 802, a first electronic device receives, from a second electronic device, credential data comprising: (i) at least a portion of a first hash value of at least a portion of an identifier associated with a WAP, and (ii) at least a portion of a second hash value of at least a portion of a first password stored by the second electronic device in association with the SSID. At an operation 804, the first electronic device identifies the WAP based at least in part on the at least the portion of the first hash value.

At an operation 806, the first electronic device determines a second password stored by the first electronic device in association with the WAP. At an operation 808, the first electronic device computes a third hash value of at least a portion of the second password and, at an operation 810, determines whether the second and third hash values match. If so, then at an operation 812, the first electronic device may refrain from generating second credential data. If not, however, then at an operation 814, the first electronic device may generate second credential data comprising: (i) at least the portion of the first hash value, and (ii) at least a portion of the third hash value. At an operation 816, the first electronic device determines whether credential data has been sent by another electronic device in the environment. If so, then an operation 818, the first electronic device refrains from sending the second credential data. If not, then at operation 820, the first electronic device sends the second credential data to the second electronic device.

Figure 9:
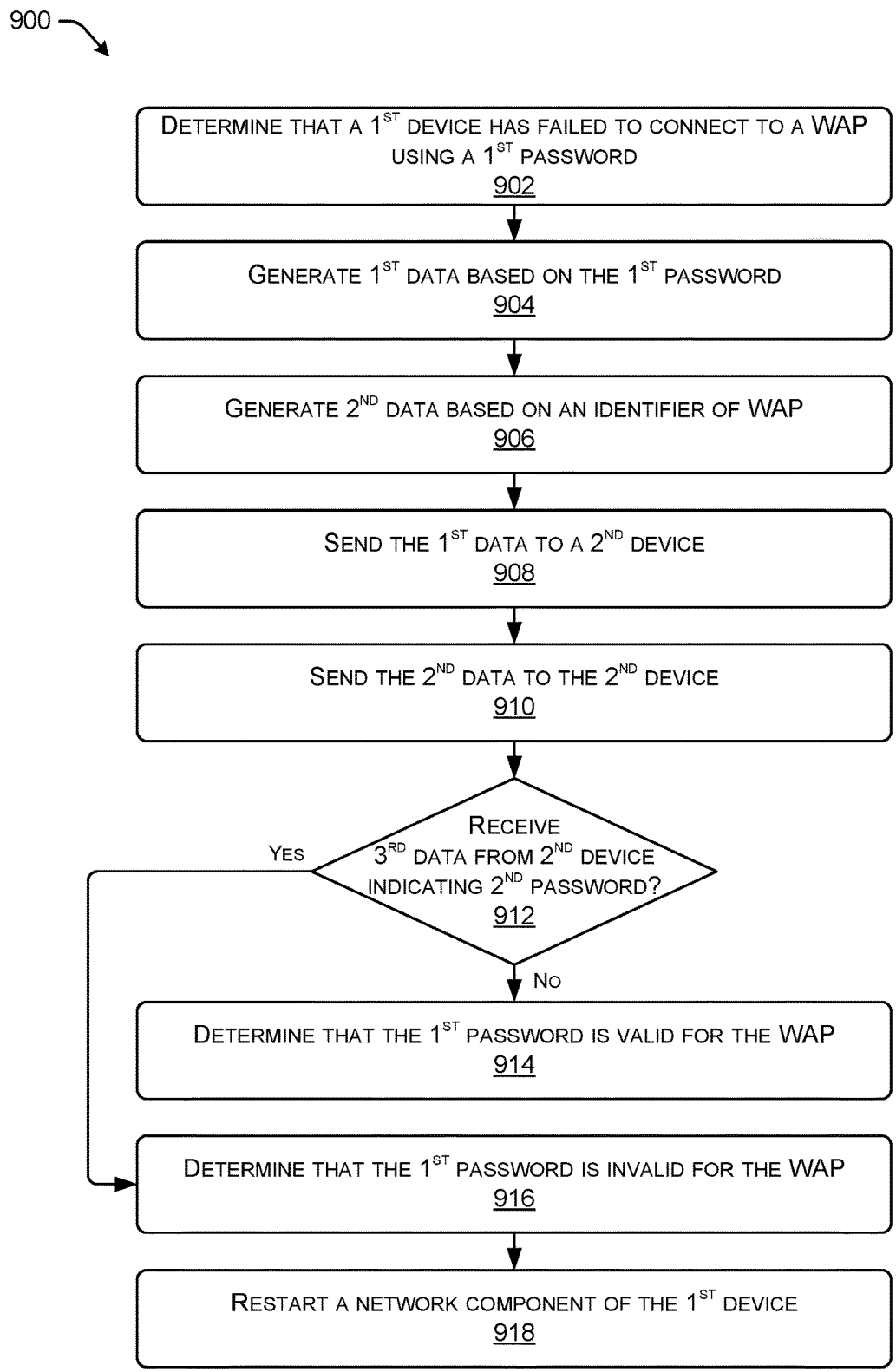
FIG. 9 illustrates a flow diagram of another example process in which a first device determines whether to restart a network component or request a new network password in response to failing to establish a connection with a WAP.

FIG. 9 illustrates a flow diagram of another example process 900 in which a first device determines whether to restart a network component or request a new network password in response to failing to establish a connection with a WAP. At an operation 902, a first electronic device determines that it has failed to connect to a WAP using a first password. At an operation 904, the first electronic device generates first data based at least in part on the first password. This may comprise generating the first data at least in part by computing a hash value of the first password. At an operation 906, the first electronic device generates second data based at least in part on an identifier associated with the WAP. This may comprise generating the second data at least in part by computing a hash value of the identifier associated with the WAP. At an operation 908, the first electronic device sends the first data to at least a second electronic device and, at an operation 910, sends the second data to at least the second electronic device.

At an operation 912, the first electronic device determines whether it has received third data from the second electronic device indicating that the second electronic device has connected to the WAP using a second password that is different than the first password. This may comprise receiving at least a portion of a second hash value computed by the second electronic device using at least a portion of the second password, determining that no response to the first data has been received from the at least the second electronic device within a threshold amount of time, or the like.

In response to determining that second data has not been received, an operation 914 represents the first electronic device determining that the first password is likely valid for the WAP. In response to determining that second data has been received, an operation 916 represents the first electronic device determining that the first password is likely invalid for the WAP. At an operation 918, the first electronic device may restart at least one wireless-network component of the first electronic device at least partly in response to determining that the first password is invalid.

Figure 10:
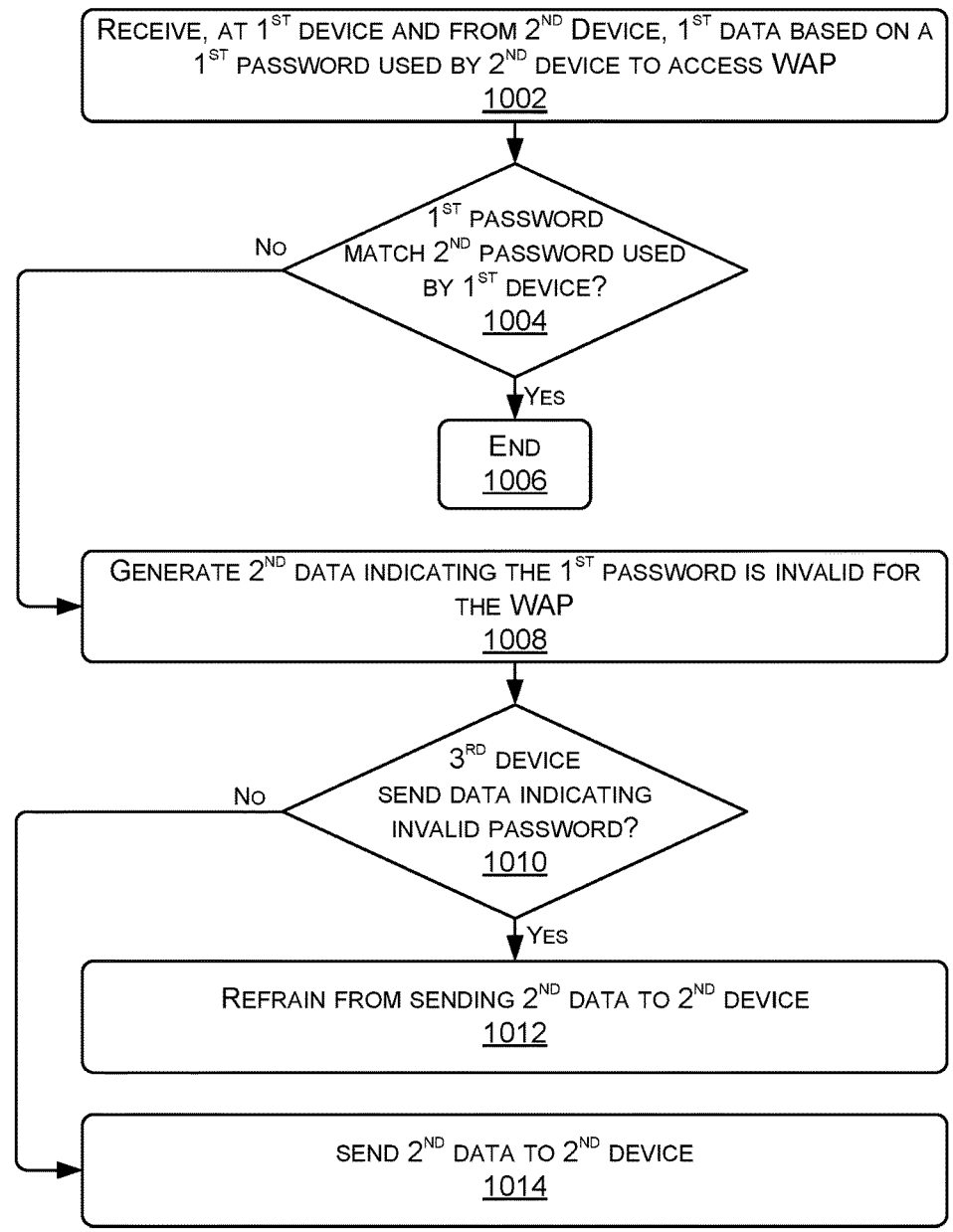
FIG. 10 illustrates a flow diagram of another example process in which a first device in an environment receives, from a second device in the environment, an indication that the first device has failed to connect with a WAP and an indication of a password used by the first device to attempt to establish the connection. In response to receiving this information, the first device may determine whether it is using the same or different password to access the WAP and respond (or refrain from responding) accordingly.

FIG. 10 illustrates a flow diagram of another example process 1000 in which a first device in an environment receives, from a second device in the environment, an indication that the first device has failed to connect with a WAP and an indication of a password used by the first device to attempt to establish the connection. In response to receiving this information, the first device may determine whether it is using the same or different password to access the WAP and respond (or refrain from responding) accordingly.

At an operation 1002, a first electronic device receives, from a second device, first data from a second electronic device, the first data based at least in part on a first password used by the second electronic device to attempt to connect to a WAP. At an operation 1004, the first electronic device determines whether the first password matches a second password used by the first electronic device to access the WAP. This operation may comprise comparing hash values of the first and second passwords. If the passwords are determined to match, then the process 1000 may end at 1006. If not, then at an operation 1008, the first electronic device generates second data indicating that the first password is invalid for the WAP. This may comprise generating the second data at least in part by computing a first hash value using at least the portion of the identifier of the WAP and a second hash value using at least a portion of the second password.

At an operation 1010, the first electronic device determines whether a third electronic device has sent data indicating that the first password is invalid. If so, then an operation 1012 represents, the first electronic device refraining from sending the second data to the second electronic device. If not, however, then at an operation 1014, the first electronic device sends the second data to the second electronic device. This may comprise sending a broadcast message from the first electronic device to one or more other electronic devices in an environment including the second electronic device.

Figure 11:
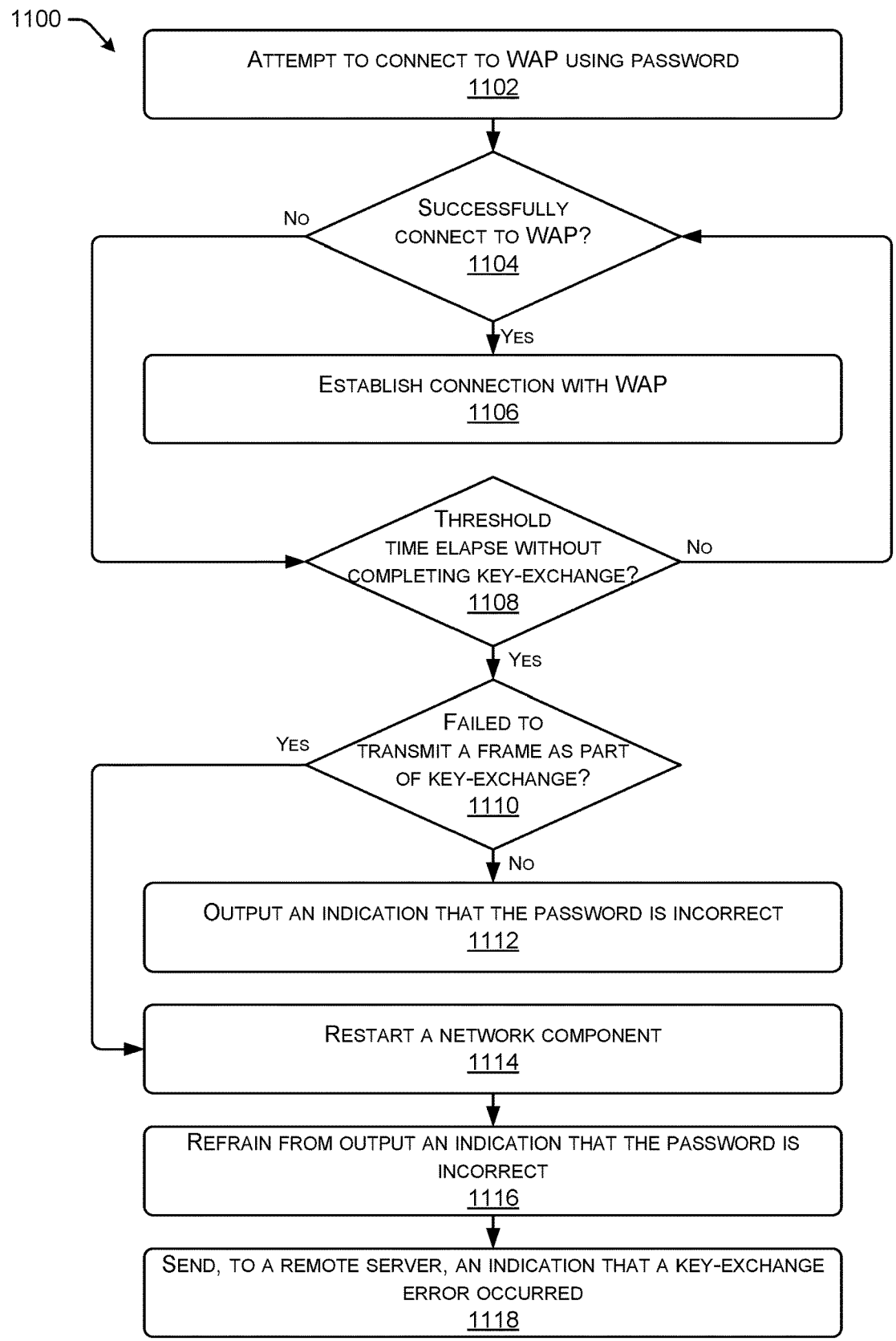
FIG. 11 illustrates a flow diagram of another example process for determining whether to restart a network component or request a new password in response to failing to establish a connection with a WAP and based on whether the client device has failed to transmit a frame during a key-exchange process with the WAP.

FIG. 11 illustrates a flow diagram of another example process 1100 for determining whether to restart a network component or request a new password in response to failing to establish a connection with a WAP and based on whether the client device has failed to transmit a frame during a key-exchange process with the WAP.

At an operation 1102, an electronic device attempts to connect to a WAP using a password. At an operation 1104, the electronic device determines whether it has successfully connected to the WAP. If so, then an operation 1106 represents the electronic device establishing the successful connection. If not, then at an operation 1108, the electronic device determines whether a threshold amount of time has elapsed without completing a key-exchange process between the electronic device and the WAP. If not, then the process 1100 returns to the operation 1104. If so, then at an operation 1110, the electronic device determines whether the electronic device failed to successfully transmit, to the WAP, at least one frame associated with the key-exchange process. This may comprise receiving, from a wireless driver of a wireless chipset of the electronic device, an indication that the electronic device failed to successfully transmit, to the WAP, the at least one frame associated with the key-exchange process or calling an application program interface (API) to determine that the electronic device failed to successfully transmit, to the WAP, the at least one frame associated with the key-exchange process. In some instances, determining that the electronic device failed to successfully transmit, to the WAP, at least one frame associated with the key-exchange process comprises determining that the electronic device failed to successfully transmit, to the WAP, an extensible-authentication-protocol-over-LAN (EAPoL) frame, receiving, from the wireless driver an indication that an acknowledgment (ack) message was not received from the WAP during key-exchange process, and/or receiving, from the wireless driver, an indication that the at least one frame associated with the key-exchange process did not leave a buffer associated with the wireless chipset.

If the electronic device does not determine that it failed to transmit a frame during the key-exchange process, then at an operation 1112, the electronic device outputs an indication that the password is incorrect. If the electronic device determines that it has failed to transmit a frame during the key-exchange process, then at an operation 1114, the electronic device restarts at least one wireless-network component of the electronic device. In addition, at an operation 1116, the electronic device may also refrain, at least partly in response to (i) determining that the threshold amount of time has elapsed and (ii) determining that the electronic device failed to successfully transmit the least one frame to the WAP, from outputting an indication that a password stored on the electronic device in association with the WAP is incorrect. At an operation 1118, the electronic device may also send, to a server that is remote from the electronic device, data indicating that a key-exchange error occurred at the electronic device.

In some implementations, the processors(s) described herein may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) may possess its own local memory, which also may store program modules, program data, and/or one or more operating systems. The processors(s) may be located in a single device or system, or across disparate devices or systems, which may be owned or operated by various entities.

The computer-readable media described herein may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

EXAMPLE CLAUSES

Clause 1: An electronic device comprising: a wireless chipset storing a wireless driver, the wireless driver configured to: determine when the wireless chipset fails to send a data frame to a wireless access point (WAP) as part of a key-exchange process with the WAP; and output an indication that the wireless chipset failed to send the data frame to the WAP; one or more processors; and one or more computer-readable media storing computer-executable instructions that, when executed, cause the one or more processors to perform acts comprising: determining that a timeout condition has occurred for performing the key-exchange process with the WAP; receiving, from the wireless driver, the indication that the wireless chipset failed to send the data frame to the WAP; and restarting the wireless chipset at least partly in response to: (i) determining that the timeout condition occurred, and (ii) receiving the indication.

Clause 2: The electronic device as recited in clause 1, wherein the wireless driver is configured to determine when the wireless chipset fails to send an extensible-authentication-protocol-over-LAN (EAPoL) frame as part of the key-exchange with the WAP.

Clause 3: An electronic device comprising: one or more processors; and one or more computer-readable media storing computer-executable instructions that, when executed, cause the one or more processor to perform acts comprising: determining that a threshold amount of time has elapsed without completing a key-exchange process between the electronic device and a wireless access point (WAP); determining that the electronic device failed to successfully transmit, to the WAP, at least one frame associated with the key-exchange process; and restarting at least one wireless-network component of the electronic device.

Clause 4: The electronic device as recited in clause 3, further comprising a wireless chipset, and wherein the restarting the at least one wireless-network component of the electronic device comprises restarting the wireless chipset.

Clause 5: The electronic device as recited in clause 3, further comprising a wireless chipset storing a wireless driver, the wireless driver configured to determine that the electronic device failed to successfully transmit, to the WAP, the at least one frame associated with the key-exchange process and output an indication that the electronic device failed to successfully transmit, to the WAP, the at least one frame associated with the key-exchange process.

Clause 6: The electronic device as recited in clause 3, further comprising a wireless chipset storing a wireless driver, the wireless driver configured to determine that the electronic device failed to successfully transmit, to the WAP, the at least one frame associated with the key-exchange process, and wherein the one or more computer-readable media further store computer-executable instructions that, when executed, cause the one or more processors to perform an act comprising calling an application program interface (API) to determine that the electronic device failed to successfully transmit, to the WAP, the at least one frame associated with the key-exchange process.

Clause 7: The electronic device as recited in clause 3, wherein the determining that the electronic device failed to successfully transmit, to the WAP, at least one frame associated with the key-exchange process comprises determining that the electronic device failed to successfully transmit, to the WAP, an extensible-authentication-protocol-over-LAN (EAPoL) frame.

Clause 8: The electronic device as recited in clause 3, further comprising a wireless chipset storing a wireless driver, and wherein: the one or more computer-readable media further store computer-executable instructions that, when executed, cause the one or more processors to perform an act comprising receiving, from the wireless driver an indication that an acknowledgment (ack) message was not received from the WAP during key-exchange process; and the determining that the electronic device failed to successfully transmit, to the WAP, at least one frame associated with the key-exchange process occurs at least partly in response to receiving the indication.

Clause 9: The electronic device as recited in clause 3, further comprising a wireless chipset storing a wireless driver, and wherein: the one or more computer-readable media further store computer-executable instructions that, when executed, cause the one or more processors to perform an act comprising receiving, from the wireless driver, an indication that the at least one frame associated with the key-exchange process did not leave a buffer associated with the wireless chipset; and the determining that the electronic device failed to successfully transmit, to the WAP, at least one frame associated with the key-exchange process occurs at least partly in response to receiving the indication.

Clause 10: The electronic device as recited in clause 3, wherein the one or more computer-readable media further store computer-executable instructions that, when executed, cause the one or more processors to perform an act comprising refraining, at least partly in response to (i) determining that the threshold amount of time has elapsed and (ii) determining that the electronic device failed to successfully transmit the least one frame to the WAP, from outputting an indication that a password stored on the electronic device in association with the WAP is incorrect.

Clause 11: The electronic device as recited in clause 3, wherein the one or more computer-readable media further store computer-executable instructions that, when executed, cause the one or more processors to perform an act comprising sending, to a server that is remote from the electronic device, data indicating that a key-exchange error occurred at the electronic device.

Clause 12: A method implemented at least in part by an electronic device, the method comprising: determining that a timeout condition associated with a key-exchange process between the electronic device and a wireless access point (WAP) has occurred; determining that the electronic device failed to successfully transmit, to the WAP, at least one frame associated with the key-exchange process; and restarting at least one wireless-network component of the electronic device.

Clause 13: The method as recited in clause 12, wherein the restarting the at least one wireless-network component of the electronic device comprises restarting a wireless chipset of the electronic device.

Clause 14: The method as recited in clause 12, further comprising receiving, from a wireless driver stored on a wireless chipset of the electronic device, an indication that the electronic device failed to successfully transmit, to the WAP, the at least one frame associated with the key-exchange process.

Clause 15: The method as recited in clause 12, further comprising calling an application program interface (API) to determine, from a wireless driver stored on a wireless chipset of the electronic device, that the electronic device failed to successfully transmit, to the WAP, the at least one frame associated with the key-exchange process.

Clause 16: The method as recited in clause 12, wherein the determining that the electronic device failed to successfully transmit, to the WAP, at least one frame associated with the key-exchange process comprises determining that the electronic device failed to successfully transmit, to the WAP, an extensible-authentication-protocol-over-LAN (EAPoL) frame.

Clause 17: The method as recited in clause 12, further comprising receiving, from a wireless driver stored on a wireless chipset of the electronic device, an indication that an acknowledgment (ack) message was not received from the WAP during key-exchange process; and wherein the determining that the electronic device failed to successfully transmit, to the WAP, at least one frame associated with the key-exchange process occurs at least partly in response to receiving the indication.

Clause 18: The method as recited in clause 12, further comprising receiving, from a wireless driver stored on a wireless chipset of the electronic device, an indication that the at least one frame associated with the key-exchange process did not leave a buffer associated with the wireless chipset; and wherein the determining that the electronic device failed to successfully transmit, to the WAP, at least one frame associated with the key-exchange process occurs at least partly in response to receiving the indication.

Clause 19: The method as recited in claim 12, further comprising refraining, at least partly in response to (i) determining that the threshold amount of time has elapsed and (ii) determining that the electronic device failed to successfully transmit the least one frame to the WAP, from outputting an indication that a password stored on the electronic device in association with the WAP is incorrect.

Clause 20: The method as recited in claim 12, further comprising sending, to a server that is remote from the electronic device, data indicating that a key-exchange error occurred at the electronic device.

What is claimed is:

1. A first electronic device comprising:
   one or more processors; and
   one or more computer-readable media storing computer-executable instructions that, when executed, cause the one or more processors to perform acts comprising:
      determining that the first electronic device has failed to connect to a wireless access point (WAP) using a first password;
      generating first data based in part on a portion of a first hash value of the first password;
      broadcasting the first data within an environment of the first electronic device, the environment including a second electronic device communicably coupled to the WAP;
      receiving second data from the second electronic device, the second data indicating that the second electronic device is connected to the WAP using a second password that is different than the first password, the second data comprising a portion of a second hash value computed using a portion of the second password; and
      determining that the first password is invalid based in part on determining that the portion of the first hash value does not match the portion of the second hash value.

2. The first electronic device as recited in claim 1, wherein the one or more computer-readable media further store computer-executable instructions that, when executed, cause the one or more processors to perform acts comprising:
   generating third data based in part on an identifier associated with the WAP; and
   sending the third data to the second electronic device.

3. The first electronic device as recited in claim 1, wherein the one or more computer-readable media further store computer-executable instructions that, when executed, cause the one or more processors to perform acts comprising:
   determining that the first electronic device has failed to connect to the WAP using the second password;

generating third data based in part on a portion of a third hash value of the second password;
broadcasting the third data within the environment; and
determining that the second password is valid based in part on determining that a response to the third data has not been received from the second electronic device within a threshold amount of time after sending the third data.

4. The first electronic device as recited in claim 3, wherein the one or more computer-readable media further store computer-executable instructions that, when executed, cause the one or more processors to perform an act comprising restarting at least one wireless-network component of the first electronic device at least partly in response to determining that the second password is valid.

5. The first electronic device as recited in claim 1, wherein the one or more computer-readable media further store computer-executable instructions that, when executed, cause the one or more processors to perform acts comprising:
receiving, after the first electronic device has successfully connected to the WAP using the second password, third data from a third electronic device, the third data based in part on an identifier of the WAP and based in part on a third password used by the third electronic device to attempt to connect to the WAP;
determining that the third password does not correspond to the second password;
generating fourth data indicating that the third password is invalid; and
sending the fourth data to the third electronic device.

6. The first electronic device as recited in claim 1, wherein the one or more computer-readable media further store computer-executable instructions that, when executed, cause the one or more processors to perform acts comprising:
receiving, after the first electronic device has successfully connected to the WAP using the second password, third data from a third electronic device, the third data based in part on an identifier of the WAP and based in part on a third password used by the third electronic device to attempt to connect to the WAP;
determining that the third password does not correspond to the second password;
generating fourth data indicating that the third password is invalid;
determining that a fourth electronic device has sent fifth data indicating that the third password is invalid; and
deleting the fourth data.

7. A method performed by a first electronic device, the method comprising:
determining that the first electronic device has failed to connect to a wireless access point (WAP) using a first password;
generating first data based in part on a portion of a first hash value of the first password;
broadcasting the first data within an environment of the first electronic device, the environment including a second electronic device communicably coupled to the WAP;
receiving second data from the second electronic device, the second data indicating that the second electronic device is connected to the WAP using a second password that is different than the first password, the second data comprising a portion of a second hash value computed using a portion of the second password; and
determining that the first password is invalid based in part on the portion of the first hash value and the portion of the second hash value.

8. The method as recited in claim 7, further comprising:
generating third data based in part on an identifier associated with the WAP; and
sending the third data to the second electronic device.

9. The method as recited in claim 7, further comprising:
determining that the first electronic device has failed to connect to the WAP using the second password;
generating third data based in part on a portion of a third hash value of the second password;
broadcasting the third data within the environment; and
determining that the second password is valid based in part on determining that a response to the third data has not been received from the second electronic device within a threshold amount of time after sending the third data.

10. The method as recited in claim 9, further comprising restarting at least one wireless-network component of the first electronic device at least partly in response to determining that the second password is valid.

11. The method as recited in claim 7, further comprising:
receiving, after the first electronic device has successfully connected to the WAP using the second password, third data from a third electronic device, the third data based in part on an identifier of the WAP and based in part on a third password used by the third electronic device to attempt to connect to the WAP;
determining that the third password does not correspond to the second password;
generating fourth data indicating that the third password is invalid; and
sending the fourth data to the third electronic device.

12. The method as recited in claim 7, further comprising:
receiving, after the first electronic device has successfully connected to the WAP using the second password, third data from a third electronic device, the third data based in part on an identifier of the WAP and based in part on a third password used by the third electronic device to attempt to connect to the WAP;
determining that the third password does not correspond to the second password;
generating fourth data indicating that the third password is invalid;
determining that a fourth electronic device has sent fifth data indicating that the third password is invalid; and
deleting the fourth data.

13. The method as recited in claim 7, wherein the determining comprises determining that the first password is invalid based at least in part on determining that the portion of the first hash value does not match the portion of the second hash value.

14. One or more non-transitory computer-readable media storing computer-executable instructions that, when executed, cause one or more processors of a first electronic device to perform acts comprising:
determining that the first electronic device has failed to connect to a wireless access point (WAP) using a first password;
generating first data based in part on a portion of a first hash value of the first password;
broadcasting the first data within an environment of the first electronic device, the environment including a second electronic device communicably coupled to the WAP; and
receiving second data from the second electronic device, the second data indicating that the second electronic device is connected to the WAP using a second password that is different than the first password, the second data comprising a portion of a second hash value computed using a portion of the second password;

determining that the first password is invalid based in part on the portion of the first hash value and the portion of the second hash value.

15. The one or more non-transitory computer-readable media as recited in claim 14, wherein the one or more computer-readable media further store computer-executable instructions that, when executed, cause the one or more processors to perform acts comprising:

generating third data based in part on an identifier associated with the WAP; and sending the third data to the second electronic device.

16. The one or more non-transitory computer-readable media as recited in claim 14, wherein the one or more computer-readable media further store computer-executable instructions that, when executed, cause the one or more processors to perform acts comprising:

determining that the first electronic device has failed to connect to the WAP using the second password;

generating third data based in part on a portion of a third hash value of the second password;

broadcasting the third data within the environment; and determining that the second password is valid based in part on determining that a response to the third data has not been received from the second electronic device within a threshold amount of time after sending the third data.

17. The one or more non-transitory computer-readable media as recited in claim 16, wherein the one or more computer-readable media further store computer-executable instructions that, when executed, cause the one or more processors to perform acts comprising restarting at least one wireless-network component of the first electronic device at least partly in response to determining that the second password is valid.

18. The one or more non-transitory computer-readable media as recited in claim 14, wherein the one or more computer-readable media further store computer-executable instructions that, when executed, cause the one or more processors to perform acts comprising:

receiving, after the first electronic device has successfully connected to the WAP using the second password, third data from a third electronic device, the third data based in part on an identifier of the WAP and based in part on a third password used by the third electronic device to attempt to connect to the WAP;

determining that the third password does not correspond to the second password;

generating fourth data indicating that the third password is invalid; and sending the fourth data to the third electronic device.

19. The one or more non-transitory computer-readable media as recited in claim 14, wherein the one or more computer-readable media further store computer-executable instructions that, when executed, cause the one or more processors to perform acts comprising:

receiving, after the first electronic device has successfully connected to the WAP using the second password, third data from a third electronic device, the third data based in part on an identifier of the WAP and based in part on a third password used by the third electronic device to attempt to connect to the WAP;

determining that the third password does not correspond to the second password;

generating fourth data indicating that the third password is invalid;

determining that a fourth electronic device has sent fifth data indicating that the third password is invalid; and deleting the fourth data.

20. The one or more non-transitory computer-readable media as recited in claim 14, wherein the determining comprises determining that the first password is invalid based at least in part on determining that the portion of the first hash value does not match the portion of the second hash value.

* * * * *